(12) United States Patent
Sasou et al.

(10) Patent No.: US 6,367,727 B1
(45) Date of Patent: Apr. 9, 2002

(54) METHOD AND APPARATUS FOR PRODUCING ROLL PHOTO FILM

(75) Inventors: Masami Sasou; Teruyoshi Makino, both of Kanagawa (JP)

(73) Assignee: Fuji Photo Film Co, Ltd., Kanagawa (JP)

(*) Notice: Subject to any disclaimer, the term of this patent is extended or adjusted under 35 U.S.C. 154(b) by 0 days.

(21) Appl. No.: 09/550,177

(22) Filed: Apr. 14, 2000

Related U.S. Application Data

(62) Division of application No. 08/923,415, filed on Sep. 4, 1997, now Pat. No. 6,079,564.

(30) Foreign Application Priority Data

Sep. 4, 1996 (JP) .............................................. 8-234237
Sep. 6, 1996 (JP) .............................................. 8-236556

(51) Int. Cl.[7] ........................ G03B 23/02; G11B 23/107
(52) U.S. Cl. ............................... 242/348.1; 242/332.4; 242/332.8; 242/532.6; 242/532.7
(58) Field of Search .......................... 242/348.1, 332.4, 242/332.8, 532.6, 534, 532.7, 587.1

(56) References Cited

U.S. PATENT DOCUMENTS

| | | | | |
|---|---|---|---|---|
| 3,586,258 A | | 6/1971 | Horlezeder | ............... 242/348.1 |
| 4,445,770 A | * | 5/1984 | Morse | |
| 4,993,654 A | * | 2/1991 | Suzuki et al. | |
| 5,462,240 A | * | 10/1995 | Esaki et al. | |
| 5,465,920 A | * | 11/1995 | Merle et al. | |
| 5,595,353 A | | 1/1997 | Glover et al. | ............ 242/348.1 |
| 5,605,303 A | | 2/1997 | Glover et .l | ......... 242/348.1 X |
| 5,632,452 A | | 5/1997 | Takahashi et al. | ....... 242/332.4 |
| 5,804,032 A | * | 9/1998 | Reinders | |
| 5,859,656 A | * | 1/1999 | Aragon et al. | |
| 6,079,654 A | * | 6/2000 | Sasou et al. | |

FOREIGN PATENT DOCUMENTS

JP        2-138055        5/1990       ............... 242/532.6

* cited by examiner

Primary Examiner—William A. Rivera
(74) Attorney, Agent, or Firm—Sughrue Mion, PLLC

(57) ABSTRACT

A roll photo film includes a spool which has a cylindrical core. A light-shielding sheet has a front end portion and a rear end portion. The front end portion is secured to the core. A first end of a photo filmstrip is secured to one securing position on the light-shielding sheet. The photo filmstrip is wound about the core in a roll form with the light-shielding sheet. A roll photo film producing apparatus includes a punch/die set, which has a trimming punch and a trimming die, and trims the rear end portion with a reduced width. A hole-forming punch and a hole-forming die are incorporated in the punch/die set, and cut a retaining hole through the rear end portion in a simultaneous manner with trimming of the rear end portion.

12 Claims, 32 Drawing Sheets

| FIG.34A | FIG.34B |
|---|---|

METHOD AND APPARATUS FOR PRODUCING ROLL PHOTO FILM

This application is a division of Ser. No. 08/923,415 filed Sep. 4, 1997 now U.S. patent application Ser. No. 6,079,564.

BACKGROUND OF THE INVENTION

1. Field of the Invention

The present invention relates to a method and apparatus for producing a roll photo film. More particularly, the present invention relates to a method and apparatus for producing a roll photo film in a manner with heightened precision and efficiency.

2. Description Related to the Prior Art

There are 120 and 220 types of roll photo film. The roll photo film includes a spool, a photo filmstrip and a light-shielding sheet. The spool consists of a cylindrical core and a pair of disk-shaped flanges formed on respective ends of the core. The light-shielding sheet is connected to the photo filmstrip, and wound therewith about the photo filmstrip to protect the photo filmstrip from ambient light. To load a camera with the roll photo film of 120 or 220 type, a rear end of the light-shielding sheet with an obliquely reduced width is inserted in a slit of a camera spool, before a few turns of the light-shielding sheet with the photo filmstrip is wound about the camera spool with the light-shielding sheet kept tightened without being unwound. This is an extremely difficult operation in setting the roll photo film in the camera.

The spool has a slit formed therein for receiving insertion of the front end portion of the light-shielding sheet. To facilitate a loading operation of the camera with the roll photo film of 120 or 220 type, the light-shielding sheet of the roll photo film is provided with a retaining hole, formed in its rear end, for retention to a retaining claw of the camera spool. Inside the slit of the spool, there are formed push ridges formed therewith for preventing the light-shielding sheet from being removed.

If conventional techniques are used for producing the light-shielding sheet, the retaining hole is formed by punching after the trimming operation of a front end portion of the light-shielding sheet. However there occurs a problem in that a position of the retaining hole is likely to irregular relative to a shape of outer edges of the front end portion, due to deviations in conveying the light-shielding sheet or deviations in a position to stop the light-shielding sheet. If the retaining hole is excessively deviated, the light-shielding sheet must be bent or distorted before the retaining hole can be engaged with the retainer claw. In case the retaining hole is engageable with the retainer claw, the engagement is likely to be incomplete and unreliable.

In forming the retaining hole, punched dust is created. If the punched dust should not be removed from the punching station in the course of operation, the punched dust is likely to remain on the light-shielding sheet when wound about the spool. The punched dust is so small in the size, and difficult to discover in inspection after the manufacture. Once the roll photo film with the punched dust is purchased by a user, the punched dust is likely to lie on an exposure region of the photo filmstrip inside the camera to lower an image quality of a photograph, or cause damages to the camera. There are a black paper type and a white paper type of the light-shielding sheet. The black paper type consists of paper material and carbon mixed therewith and having black color to shield light. The white paper type consists of paper material and a light-shielding layer of a coating applied thereon. The white paper type has a characteristic of being charged electrically with ease. A serious problem arises in that the punched dust is typically likely to remain with the white paper type of the light-shielding sheet.

SUMMARY OF THE INVENTION

In view of the foregoing problems, an object of the present invention is to provide a method and apparatus for producing a roll photo film, in which a retaining hole can be cut precisely and exactly through a light-shielding sheet to be wound with a photo filmstrip.

Another object of the present invention is to provide a method and apparatus for producing a roll photo film, in which a front end of a light-shielding sheet can be inserted reliably into a slit of a spool.

A further object of the present invention is to provide a method and apparatus for producing a roll photo film, in which inconsistency between parts constituting a roll photo film, if there is any, can be detected in the course of manufacture.

Another object of the present invention is to provide a method and apparatus for producing a roll photo film, in which an adhesive tape can be attached between a photo filmstrip and a light-shielding sheet with heightened precision.

Still another object of the present invention is to provide a method and apparatus for producing a roll photo film, in which a photo filmstrip or a light-shielding sheet, during operation of rotating a spool, can be wound about the spool without scratches or other failure.

Another object of the present invention is to provide a method and apparatus for producing a roll photo film, in which a trailer sheet and a leader sheet are included in a roll photo film with a photo filmstrip, and the photo filmstrip can be wound unfailingly with the trailer sheet and the leader sheet.

In order to achieve the above and other objects and advantages of this invention, a roll photo film includes a spool having a cylindrical core, a light-shielding sheet having a front end portion and a rear end portion, the front end portion being secured to the core, and a photo filmstrip, a first end of the photo filmstrip being secured to one securing position on the light-shielding sheet, the photo filmstrip being wound about the core in a roll form with the light-shielding sheet. In a roll photo film producing apparatus, a punch/die set includes a trimming punch and a trimming die, for trimming the rear end portion with a reduced width. A hole-forming punch and a hole-forming die are incorporated in the punch/die set, for cutting a-retaining hole through the rear end portion in a substantially simultaneous manner with trimming of the rear end portion.

The retaining hole is adapted to retention of the light-shielding sheet to a second spool after exposing the photo filmstrip, the second spool includes a second cylindrical core, a slit formed in the second core in an axial direction, and a retainer claw disposed in the slit, and the retaining hole is engaged with the retainer claw before the photo filmstrip and the light-shielding sheet are wound about the second core.

Accordingly the retaining hole can be cut precisely and exactly through the light-shielding sheet to be wound with the photo filmstrip.

In a preferred embodiment, a spool has a cylindrical core and a slit formed to extend in an axial direction thereof, the slit having first and second inner faces, there being a push claw disposed on the first inner face, a light-shielding sheet having a front end portion and a rear end portion, the front end portion being inserted in the slit and retained by the push claw. In the roll photo film producing apparatus, a position setter unit rotationally sets the core in a predetermined rotational position before winding the photo filmstrip about the core, to orient the slit in one direction. An inserter unit inserts the front end portion in the slit, wherein the position setter unit and the inserter unit are so preset as to direct the front end portion of the light-shielding sheet to the second inner face at an angle of 5–200° therebetween. A rotating unit rotates the core to wind the photo-filmstrip about the core.

Furthermore, an inserter unit inserts the front end portion in the slit and for curving the light-shielding sheet away from the push claw while the front end portion is inserted.

Accordingly the front end-of the light-shielding sheet can be inserted reliably into the slit of the spool.

In another preferred embodiment for producing a roll photo film, a photo filmstrip of a predetermined length is formed by cutting continuous photo film. A light-shielding sheet of a predetermined length is formed by cutting continuous light-shielding sheet. One end of the photo filmstrip is secured to one securing position on the light-shielding sheet. A front end of the light-shielding sheet is secured to a core of a spool. The photo filmstrip and the light-shielding sheet are wound about the core in a roll form to obtain the roll photo film. In the roll photo film producing apparatus, a side printer unit is supplied with the continuous photo film, for effecting side-printing to the continuous photo film in accordance with predetermined photo film information and predetermined manufacture information being input, wherein the predetermined photo film information includes at least one of the predetermined length, sensitivity and a type of the photo filmstrip, and the predetermined manufacture information includes a number of a lot for producing the photo filmstrip. A tape attacher unit attaches an adhesive tape to the one end of the photo filmstrip, the adhesive tape having the predetermined photo film information printed thereon, and being adapted to attaching the photo filmstrip to the light-shielding sheet. A trimmer unit subjects the continuous light-shielding sheet to trimming of an outer edge of the light-shielding sheet, the continuous light-shielding sheet having the predetermined photo film information printed thereon. A seal attacher unit attaches an auxiliary seal to the continuous light-shielding sheet, the auxiliary seal having the predetermined photo film information printed thereon, and being located near to the front end portion of the light-shielding sheet, the auxiliary seal, when the photo filmstrip and the light-shielding sheet are wound about another spool after exposing the photo filmstrip, being wound about a roll of the photo filmstrip and the light-shielding sheet, to avoid unwinding the roll. A character printer unit prints the predetermined manufacture information to a closing seal in a written manner, the closing seal having the predetermined photo film information previously printed thereon. A seal winder unit winds the closing seal about the roll form of the photo filmstrip and the light-shielding sheet on the core, to avoid unwinding the roll form. First to fourth reader units respectively reads first photo film information from the light-shielding sheet, second photo film information from the adhesive tape, third photo film information from the closing seal, and fourth photo film information from the auxiliary seal. A checker unit checks coincidence between the predetermined photo film information and at least part of the first to fourth photo film information, the roll photo film being determined unacceptable if the at least part of the first to fourth photo film information is detected different from the predetermined photo film information.

Accordingly inconsistency between parts constituting a roll photo film, if there is any, can be detected in the course of manufacture.

In another preferred embodiment, a roll photo film producing apparatus includes a support stage for supporting an adhesive tape on a top surface thereof, the adhesive tape having an adhesive surface directed downwards. A plurality of air discharge holes are formed open in the top surface of the support stage, for blowing air toward the adhesive surface of the adhesive tape, to avoid fixing the adhesive tape on the support stage. A suction head sucks up the adhesive tape supported on the support stage. A photo film cutter unit cuts the continuous photo film by a predetermined length, to obtain the photo filmstrip. A head shifter unit shifts the suction head in a substantially horizontal direction from the support stage to the first end of the photo filmstrip while the suction head sucks the adhesive tape, the adhesive tape being attached to the first end of the photo filmstrip. A light-shielding sheet supplier supplies the light-shielding sheet under the photo filmstrip, to lay the first end of the photo filmstrip and the adhesive tape on the light-shielding sheet. A winder unit rotates the spool to wind the photo filmstrip about the core with the light-shielding sheet.

Accordingly the adhesive tape can be attached between the photo filmstrip and the light-shielding sheet with heightened precision.

In another preferred embodiment for producing a roll photo film, there is a conveying path through which a front end of a light-shielding sheet is advanced, the light-shielding sheet having one securing position determined thereon to which a first end of a photo filmstrip is secured. A spool holder supports a spool, the spool having a core to which the front end of the light-shielding sheet from the conveying path is secured. A winder unit rotates the spool on the spool holder in a winding direction, to wind the photo filmstrip and the light-shielding sheet about the core for obtaining the roll photo film. A roll photo film producing apparatus includes a tension applying unit, disposed in the conveying path, for applying back tension of 70–130 grams to the light-shielding sheet, or to the light-shielding sheet and the photo filmstrip, while the spool is rotated in the winding direction.

Furthermore, a pusher unit is disposed with the winder unit, for pushing the light-shielding sheet, or pushing the light-shielding sheet and the photo filmstrip, to the core of the spool with pushing force of 100–300 grams while the spool is rotated in the winding direction.

Accordingly the photo filmstrip or the light-shielding sheet, during operation of rotating the spool, can be wound about the spool without scratches or other failure.

In another preferred embodiment, a roll photo film includes a spool having a cylindrical core, a photo filmstrip having first and second ends, a trailer sheet, having light-shielding ability, for connecting the first end to the core, and a leader sheet, having light-shielding ability, and secured to the second end, the photo filmstrip being wound about the core of the spool with the trailer sheet and the leader sheet. A roll photo film producing apparatus-includes a trailer supply unit for supplying the trailer sheet toward the spool, to mount the trailer sheet on the core. A spool rotating unit rotates the spool in a winding direction to wind the trailer sheet about the core. A photo film supply unit supplies the photo filmstrip toward the spool. A first attacher unit secures the photo filmstrip to the trailer sheet with an adhesive tape, the spool rotating unit being operated thereafter to wind the photo filmstrip about the core. A leader supply unit supplies the leader sheet toward the spool. A second attacher unit secures the leader sheet to the photo filmstrip with an adhesive tape, the spool rotating unit being operated thereafter to wind the leader sheet about the core.

Accordingly the photo filmstrip can be wound reliably with the trailer sheet and the leader sheet.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
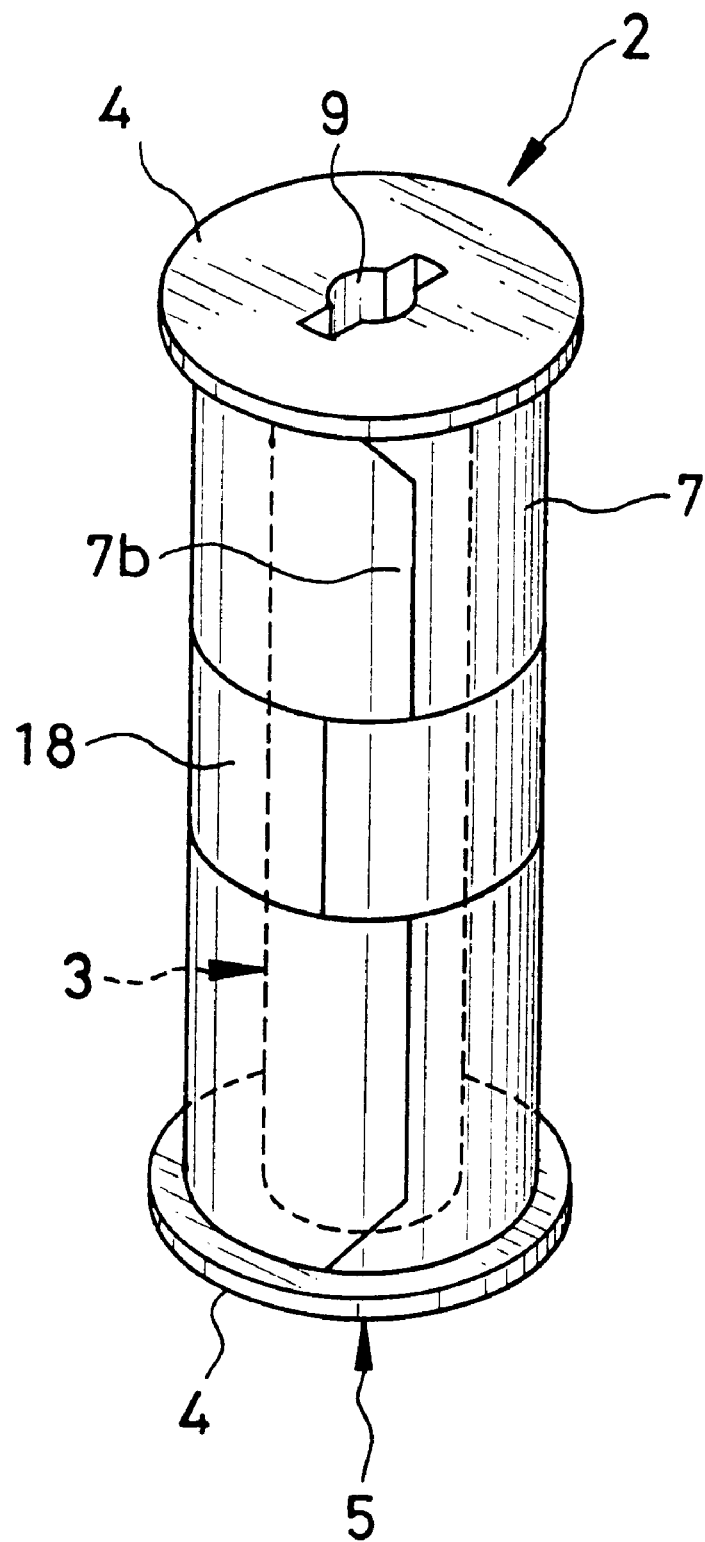
FIG. 1 is a perspective illustrating a roll photo film.

In FIG. 1, a roll photo film 2 produced by a producing apparatus is illustrated. The roll photo film 2 is a 120 type, and consists of a combination of a spool 5, a rolled photo filmstrip 6 and a light-shielding sheet 7. The spool 5 includes a core 3 of a rod shape and a pair of disk-shaped flanges 4 formed with respective ends of the core 3. The photo filmstrip 6 is wound about the core 3. See FIG. 3. The light-shielding sheet 7 covers the whole of a back surface of the photo filmstrip 6, and operates by way of lining paper.

Figure 2:
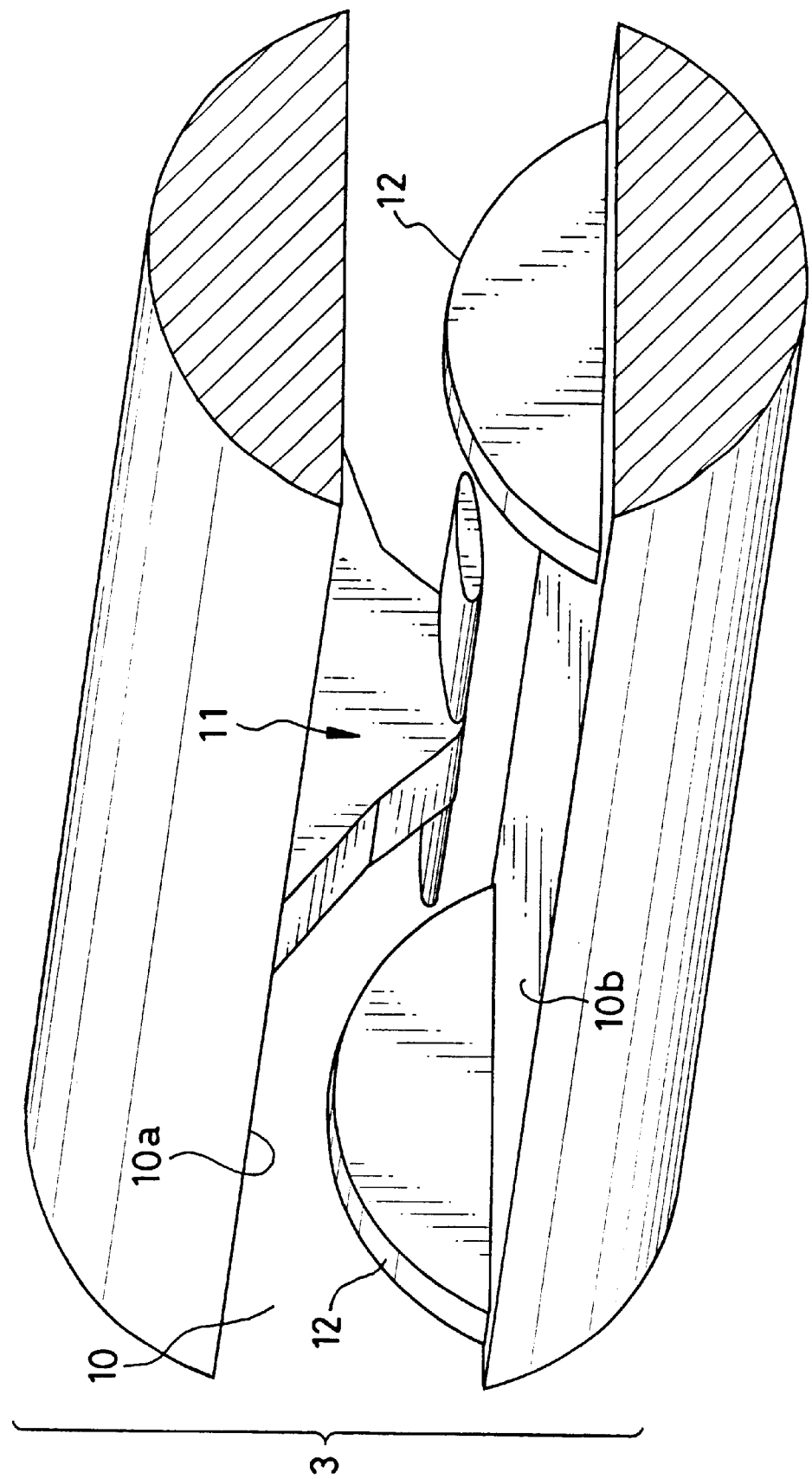
FIG. 2 is a perspective illustrating a core of a spool included in the roll photo film.

In one end face of the flanges 4 of the spool 5, there is a chucking groove 9 engageable with a key shaft of a camera. In FIG. 2, a slot or slit 10 is formed in the core 3 in parallel with the axis of the core 3. The slit 10 has a pair of inner faces 10a and 10b. A T-shaped push claw 11 is formed integrally with the inner face 10a. A pair of ridges 12 are formed integrally with the inner face 10b in a symmetric manner beside the push claw 11.

Figure 3:
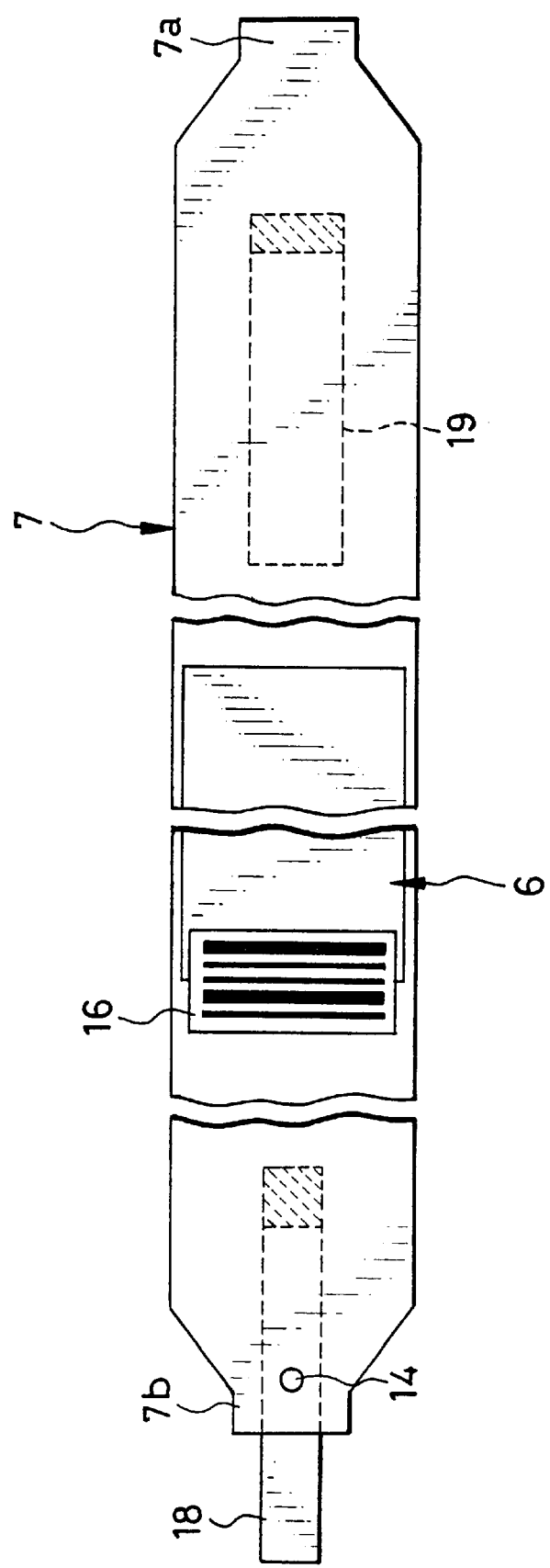
FIG. 3 is a plan illustrating a photo filmstrip of the roll photo film.
Figure 4:
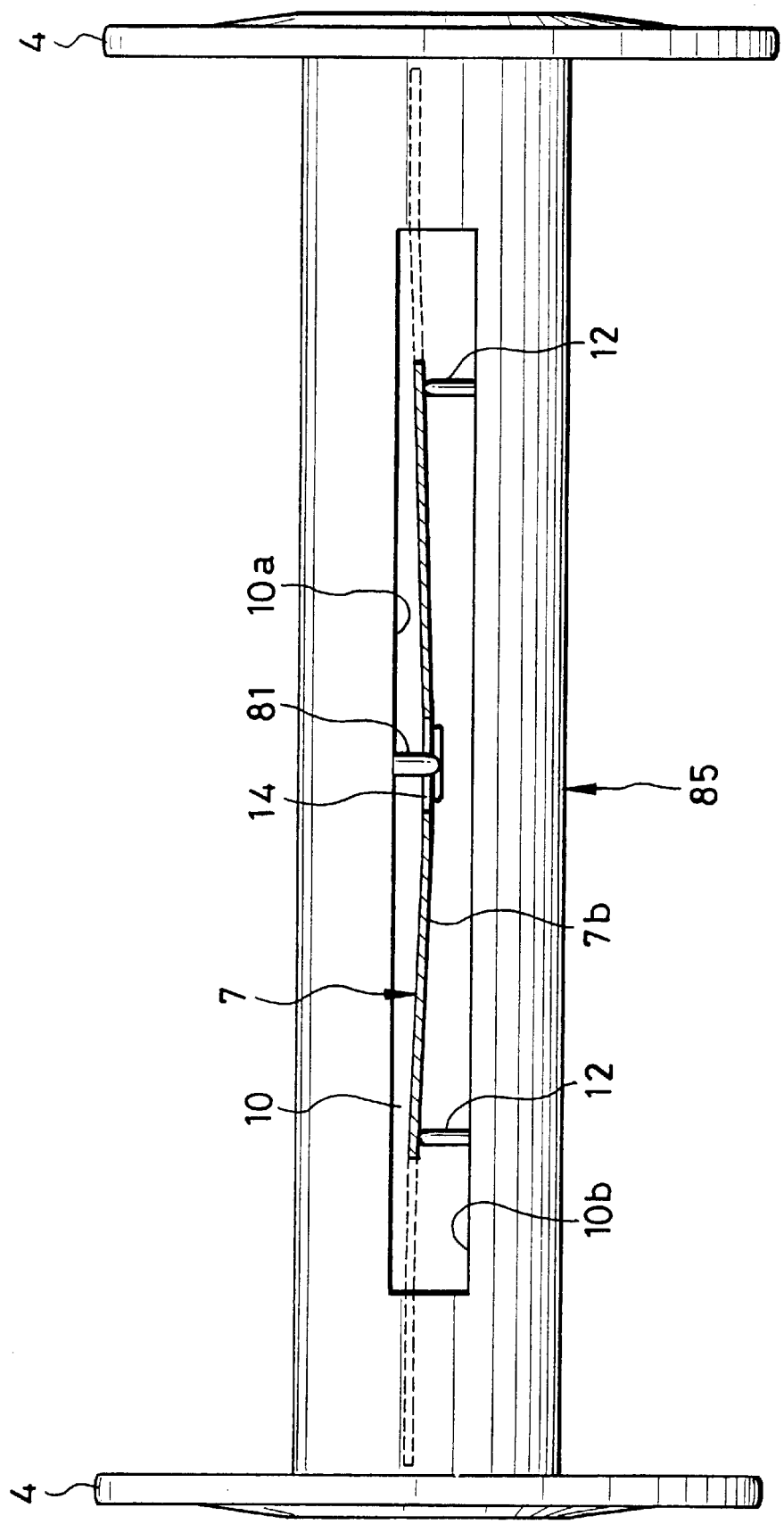
FIG. 4 is a front elevation illustrating a spool of a camera for use with the roll photo film.

In FIG. 3, the light-shielding sheet 7 has a strip shape, and has a front end 7a and a rear end 7b. The front end 7a is retained on the spool 5 in producing the roll photo film 2. The rear end 7b is formed for the purpose of retention to a camera spool 85 when the roll photo film 2 is loaded with a camera. See. FIG. 4. Both the front end 7a and the rear end 7b have a shape in which lateral edges are cut with a smaller width, and then cut obliquely in an oblique manner. The rear end 7b has a circular retaining hole 14. In FIG. 4, the rear end 7b is inserted in the slit 10 in the camera spool 85. A retaining claw 81 is fitted in the retaining hole 14. The ridges 12 push the light-shielding sheet 7 in order to avoid moving the light-shielding sheet 7 in a direction of disengaging the retaining hole 14 from the retaining claw 81.

In contrast the front end 7a has no retaining hole. When the front end 7a is inserted in the slit 10 in the spool 5. The push claw 11 pushes the front end 7a while the ridges 12 push the front end 7a in order to avoid moving the light-shielding sheet 7 in a direction of disengaging the front end 7a from the push claw 11.

One end of the photo filmstrip 6 is secured to a back surface of the light-shielding sheet 7 by use of adhesive tape 16. A securing position where the photo filmstrip 6 is secured to the light-shielding sheet 7 is predetermined relative to the rear end 7b of the light-shielding sheet 7. There is a bar code printed on the adhesive tape 16 to represent information including the length, the sensitivity and the photo film type of the photo filmstrip 6. The bar code, when a camera is loaded with the photo filmstrip 6, is read by a reader incorporated in the camera to be used in control for taking an exposure.

There are a closing seal or tape 18 and an auxiliary seal or tape 19, both attached to the light-shielding sheet 7. The closing seal 18 is located close to the rear end 7b, and when the roll photo film 2 is unused, is wound about a rolled shape of the light-shielding sheet 7 to prevent the light-shielding sheet 7 from being unwound. The auxiliary seal 19 is located close to the front end 7a, and after the roll photo film 2 is used for exposures, will be wound about a rerolled shape of the light-shielding sheet 7 to prevent the light-shielding sheet 7 from being unwound. On the light-shielding sheet 7, only hatched portions of the closing seal 18 and the auxiliary seal 19 in FIG. 3 are attached to the light-shielding sheet 7 with adhesive agent.

Figure 5:
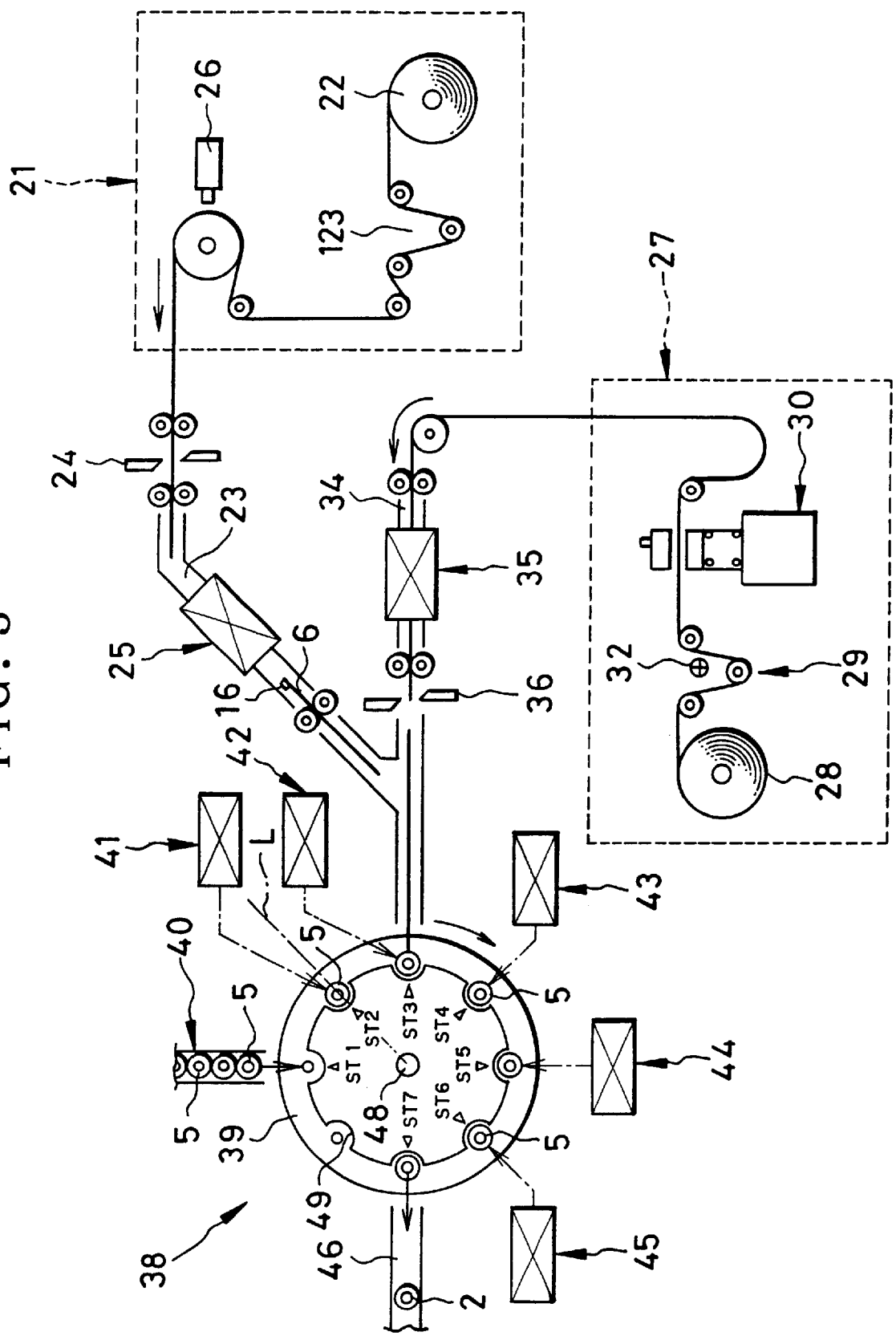
FIG. 5 is a schematic view illustrating a roll photo film producing apparatus.

In FIG. 5, a producing line for the roll photo film 2 is illustrated. A photo film supply unit 21 supplies continuous photo film 22 from a roll toward a photo film path 23. The photo film supply unit 21 also has a side printer 26, which prints photo film information including the length, the sensitivity the photo film type and the lot number of the photo filmstrip 6 to edge portions of the continuous photo film 22. A cutter 24 is disposed between the photo film supply unit 21 and the photo film path 23, and cuts the continuous photo film 22 by the regular length in conveyance toward the photo film path 23, to form the photo filmstrip 6.

A tape attacher unit 25 is disposed in a position downstream from the photo film path 23, and attaches the adhesive tape 16 to a predetermined position on the photo filmstrip 6.

A sheet supply unit 27 includes an intermittent feeder mechanism 29, a roll or source of continuous light-shielding sheet 28, and a punch/die set 30. The intermittent feeder mechanism 29 pulls and unwinds the continuous light-shielding sheet 28 by a regular length. The punch/die set 30 operates for trimming of the rear end 7b and the front end 7a of the light-shielding sheet 7 and for forming the retaining hole 14. The continuous light-shielding sheet 28 consists of printed paper to be split into a great number of light-shielding sheets 7, and is conveyed by advancing the front end 7a to be retained to the spool 5.

In the intermittent feeder mechanism 29, a static eliminator 32 is disposed for eliminating static charge from the continuous light-shielding sheet 28. Examples of the static eliminator 32 are a self-inducing type by use of gold braid or metaling tape, and a high-voltage applying type.

A sheet conveying path 34 is supplied with the continuous light-shielding sheet 28 by the sheet supply unit 27. An auxiliary seal attacher 35 is disposed in a position downstream from the sheet conveying path 34, and attaches the auxiliary seal 19 to a predetermined position on the continuous light-shielding sheet 28. A sheet cutter 36 is disposed in a position downstream from the auxiliary seal attacher 35, and cuts the continuous light-shielding sheet 28 in a predetermined position to obtain the light-shielding sheet 7.

The photo film path 23 and the sheet conveying path 34 come to join one another as a single path, which is directed to a photo film winder device 38. The photo film winder device 38 includes a spool turret 39, a spool supplier 40, a spool position setter 41, a photo film winder 42, a sheet bender 43, a closing seal attacher 44, an inspector 45 and an exit path 46.

The spool turret 39 is supported about a shaft 48, and rotated by one an eighth rotation, namely 45 degrees, in a clockwise direction. Eight spool holders 49 are disposed on the spool turret 39. There are determined seven stations ST1–ST7 for the spool-holders 49 to stop for the purpose of subjecting the spool 5 to various processes.

In station ST1, the spool 5 as a product finally obtained from one other line is received from the spool supplier 40, to set the spool 5 in each of the spool holders 49. In station ST2, the spool position setter 41 sets a rotational position of the slit 10 in the spool 5 in a regular manner.

In station ST3, the front end 7a of the light-shielding sheet 7 is inserted into the slit 10 in the spool 5. The photo film winder 42 rotates the spool 5 in the winding direction to wind the light-shielding sheet 7 and the photo filmstrip 6 about the core 3. In station ST4, the sheet bender 43 bends or folds the rear end 7b inwards while keeping the rolled shape of the light-shielding sheet 7 about the spool 5 from being unwound.

In station ST5, the closing seal attacher 44 attaches the closing seal 18 on the periphery of the rolled shape of the light-shielding sheet 7. In station ST6, the inspector 45 inspects a contour of the roll photo film 2. In station ST7, the roll photo film 2 is removed from the one of the spool holders 49, and exited to the exit path 46.

Figure 6:
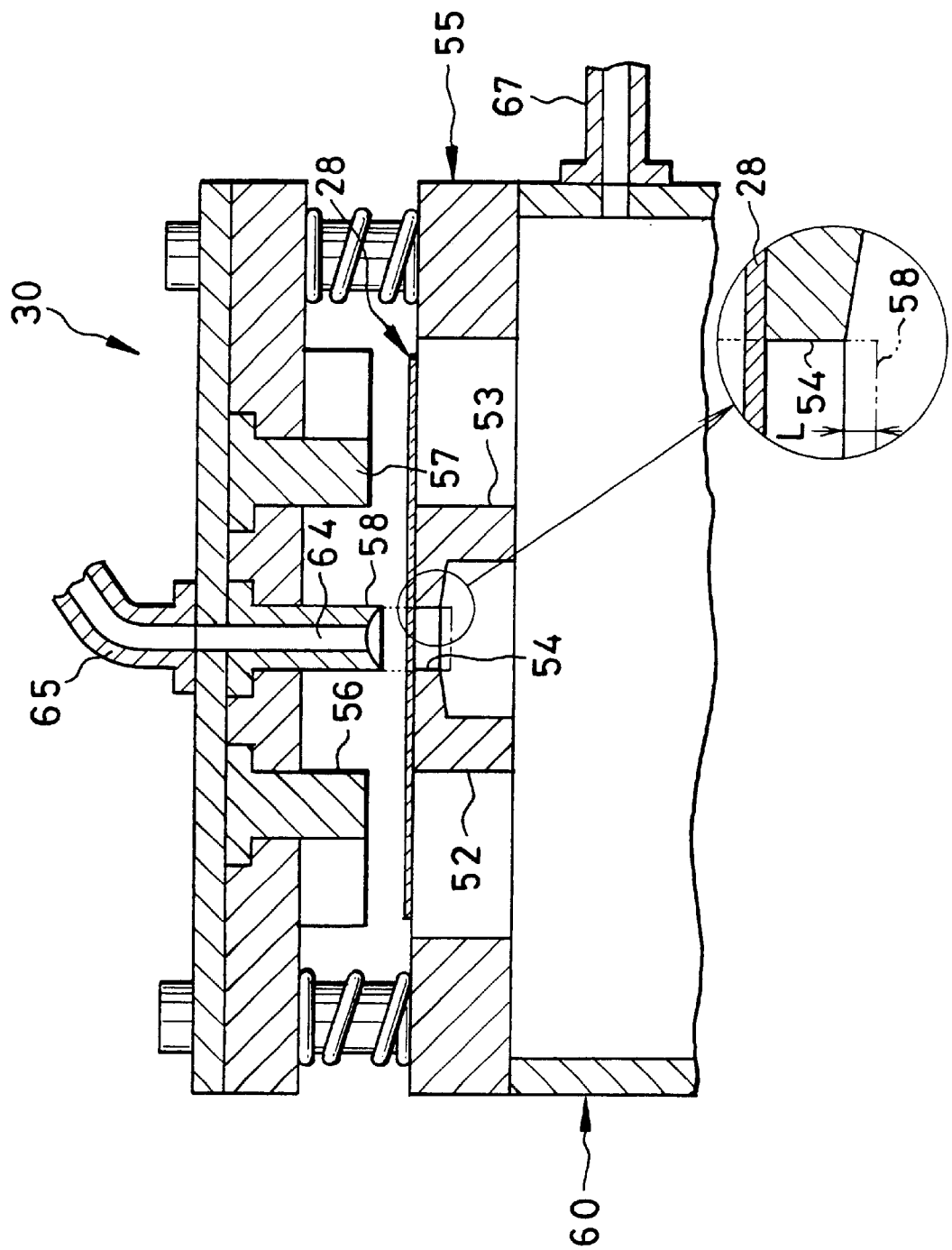
FIG. 6 is a cross section illustrating a punch/die set of the producing apparatus.

In FIG. 6, the punch/die set 30 is illustrated. The punch/die set 30 includes a stationary support 55 and a movable support 59 movable vertically to the stationary support 55. On the stationary support 55, there are disposed trimming dies 52 and 53 and a hole-forming die 54. The trimming dies 52 and 53 operate for trimming of the light-shielding sheet 7. The hole-forming die 54 operates for forming the retaining hole 14. On the movable support 59, there are disposed trimming punches 56 and 57 and a hole-forming punch 58. The trimming punches 56 and 57 operate for trimming of the light-shielding sheet 7. The hole-forming punch 58 has a bottom end in which an arcuate recess is formed, and operates for forming the retaining hole 14. A receptacle 60 supports the stationary support 55, and receives dust created by the punching operation, dust including punched dust formed from the retaining hole 14, and edge dust formed by the trimming operation.

Figure 7:
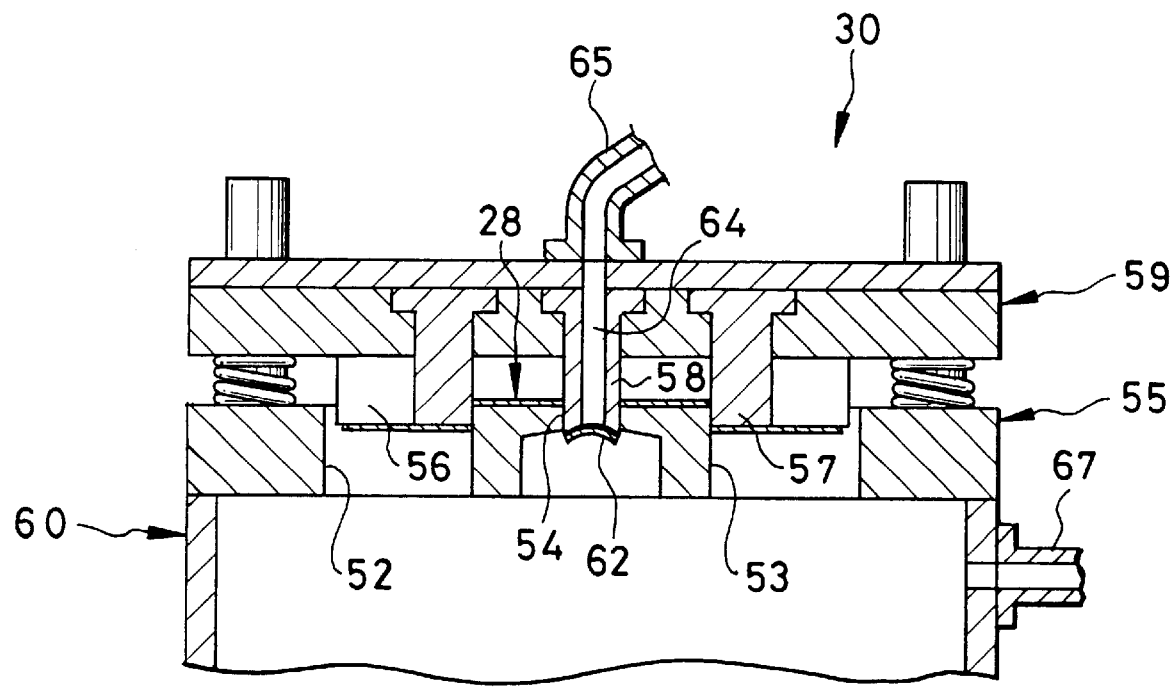
FIG. 7 is cross section illustrating a state where the punch/die set starts punching.

When the continuous light-shielding sheet 28 is stopped in the punch/die set 30, the movable support 59 is moved down by drive mechanism including cams, linkages, air cylinders and the like, which are not shown. In FIG. 7, the movable support 59 is moved down. The trimming punches 56 and 57 and the hole-forming punch 58 are received in the trimming dies 52 and 53 and the hole-forming die 54. The rear end 7b and the front end 7a of the light-shielding sheet 7 are trimmed at the same time as the retaining hole 14 is formed. This simultaneous operation makes it possible to form the retaining hole 14 in a reliably unchanged position relative to the rear end 7b of the light-shielding sheet 7.

To separate the continuous light-shielding sheet 28 from punched dust 62 created by forming the retaining hole 14, the bottom tip of the hole-forming punch 58 comes down to a position lower than the hole-forming die 54 by a length L when the hole-forming punch 58 comes down the lowest through the hole-forming die 54.

Figure 8:
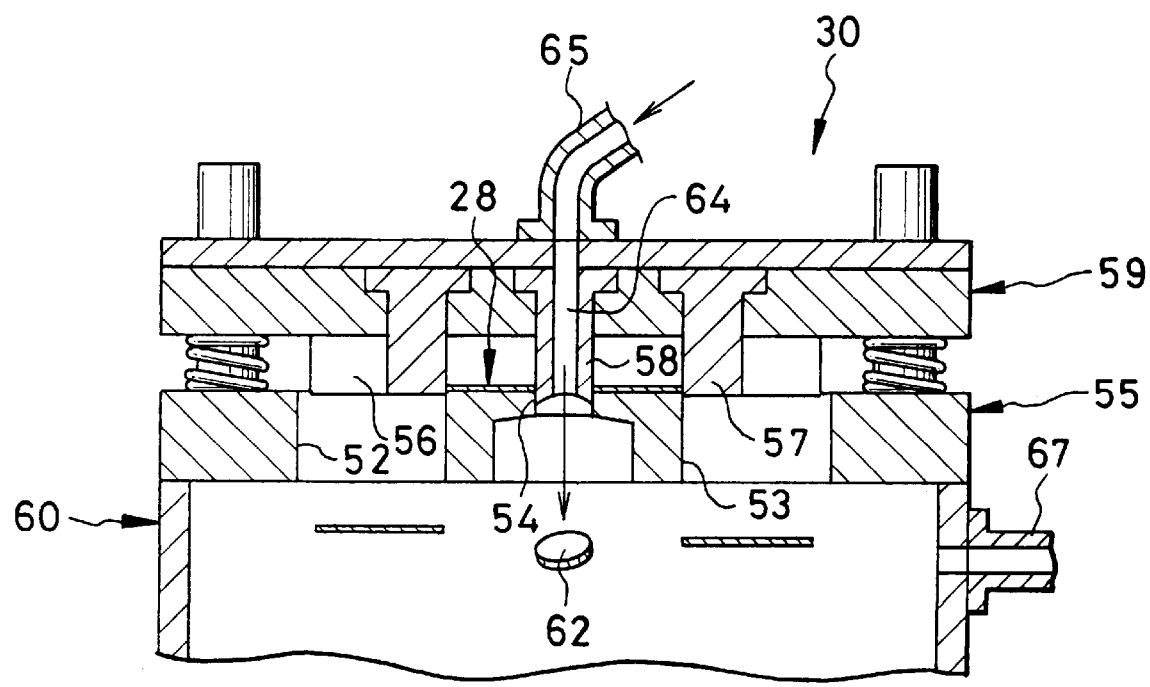
FIG. 8 is a cross section illustrating a state where a retaining hole is finally formed by the punch/die set.
Figure 9:
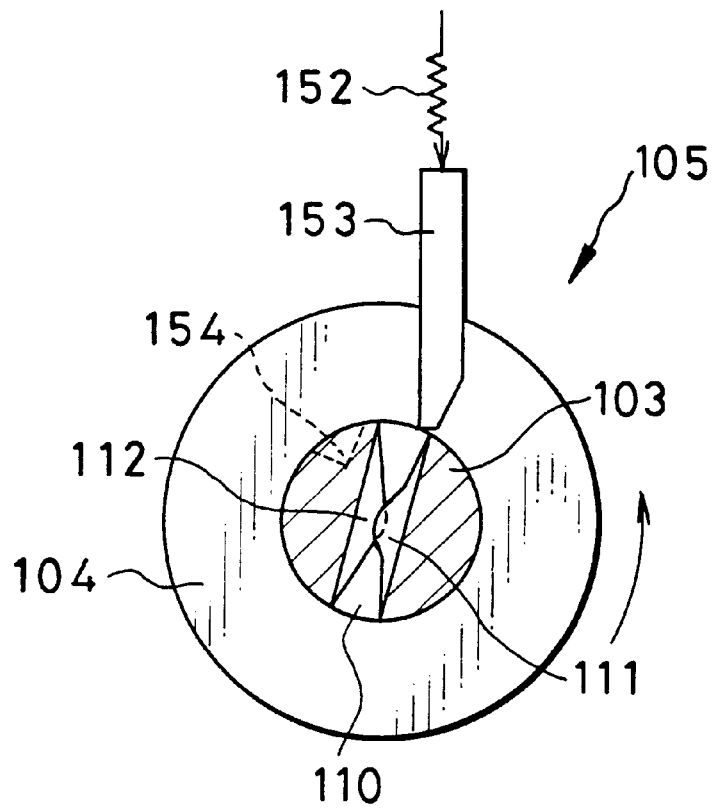
FIG. 9 is an explanatory view partially in section, illustrating another preferred embodiment in which a spool position setter starts operating for positioning the spool.

The hole-forming punch 58 has an air path 64 formed therein. A pipe 65 is connected to the air path 64, and also to an air pump (not shown). In FIG. 8, the air pump is actuated at the start of lifting the movable support 59 after the trimming and hole-forming operation therewith, to blow air through the pipe 65 and the air path 64, forcibly to drop the punched dust 62 down-away from the hole-forming punch 58.

A pipe 67 is connected to the inside of the receptacle 60 on one wall thereof. To the pipe 67, an air pump is connected. The air pump applies suction of air, for the purpose of causing the punched dust 62 to drop down away from the hole-forming die 54 into the receptacle 60 with higher reliability.

Thus the continuous light-shielding sheet 28 before operation of the punch/die set 30 is treated by the static eliminator 32 for elimination of static charge. The retaining hole 14 is formed at the same time as the contour of the rear end 7b. The bottom tip of the hole-forming punch 58 comes down lower than the hole-forming die 54 by a length L when the hole-forming punch 58 comes down the lowest through the hole-forming die 54, to separate the punched dust 62 completely from the continuous light-shielding sheet 28. Air is blown through the hole-forming punch 58. Air is sucked through the receptacle 60. Consequently the retaining hole 14 can have a position constantly unchanged relative to the contour of the rear end 7b. The punched dust 62 is kept from being deposited on the continuous light-shielding sheet 28.

EXAMPLE

Experiments were conducted with the punch/die set 30 in plural conditions for the continuous light-shielding sheet 28 in various conditions. Table 1 below indicates a ratio of depositing the punched dust 62 on the continuous light-shielding sheet 28 as results of the experiments.

In the experiments:
Punch/die set A: the hole-forming punch 58 had L=−0.5 mm, and no air blow was applied.
Punch/die set B: the hole-forming punch 58 had L=1 mm, and no air blow was applied.
Punch/die set C: the hole-forming punch 58 had L=1 mm, and the air blow was applied.
Continuous light-shielding sheet A: black paper, consisting of paper material and carbon mixed therewith.
Continuous light-shielding sheet B: white paper, consisting of paper material and a light-shielding layer formed thereon, without use of the static eliminator 32.
Continuous light-shielding sheet C: the same as Sheet B, but additionally subjected to a process of eliminating static charge at the static eliminator 32.

TABLE 1

|  |  | Amount of the charge stored in the sheet | Punch/die set A | B | C |
| --- | --- | --- | --- | --- | --- |
| Light-shielding sheets | A | 0 Kv | 30–50% | 0.5–1% | none |
|  | B | 10 Kv | 70–90% | 30–50% | 5–8% |
|  | C | 8 Kv | 30–50% | 0.5–1% | none |

As observed in Table 1, Punch/die set C was remarkably effective and advantageous. The white paper as Sheets B and C has a characteristic of being charged electrically with ease. When the amount of charge was 1 Kv (KV) or more, the ratio of depositing the punched dust 62 on the continuous light-shielding sheet 28 was seriously increased. However it was possible to prevent the punched dust 62 from depositing by eliminating the charge with the static eliminator 32.

The optimum value of L of the hole-forming punch 58 is 1 mm, but L can be in a range of 0–2 mm with a similar effect. Let a blade of the hole-forming die 54 be 2 mm thick. To set L of the hole-forming punch 58 in the range of 0–2 mm, a lowering amount of the movable support 59 should be set in a range of 2–4 mm with reference to a position where the hole-forming punch 58 contacts the hole-forming die 54. Let the hole-forming punch 58 be 6 mm across. An inner diameter of the air path 64 can be in a optimum range of 1–3 mm, in consideration of durability of the hole-forming punch 58 and force of the blow of air.

The bottom end of the hole-forming punch 58 preferably has the arcuate recess of which a radius of curvature is R6–R30, in consideration of avoiding depositing the punched dust 62 inside the hole-forming punch 58. Examples of material from which the hole-forming punch 58 is formed are super-hard steel, high-speed steel and die steel. The bottom end of the hole-forming punch 58, instead of the arcuate recess, may have a V-shaped recess.

Note that the roll photo film 2 is a 120 type in accordance with the above embodiment, but may be a 220 type or any other type in the present invention.

Referring now to FIGS. 9–18, another preferred embodiment is described, in which a front end of a light-shielding sheet can be inserted reliably into a slit of a spool.

At first, station ST1 of the above embodiment is used in the same manner. See FIG. 5. In station ST1, a spool 105 as a product finally obtained from one other line is received from a spool supplier, to set the spool 105 in a spool holder 150. In station ST2, a spool position setter unit 142 sets a rotational position of the spool 105 in a regular manner. See FIG. 16.

A motor 142a in the spool position setter unit 142 is driven to rotate. In station ST2, a spool drive shaft (not shown) included in the spool position setter unit 142 is engaged with a chucking groove in the spool 105, to cause the spool 105 to make one counterclockwise rotation in FIG. 9. At the same time as the engagement with the chucking groove, a contact claw 153 contacts a core 103 of the spool 105. The contact claw 153 is being biased by a spring 152, and constitutes a stop control device. There is a detection cutout 154 formed in the core 103 in a position where the contact claw 153 accesses the core 103.

Figure 12:
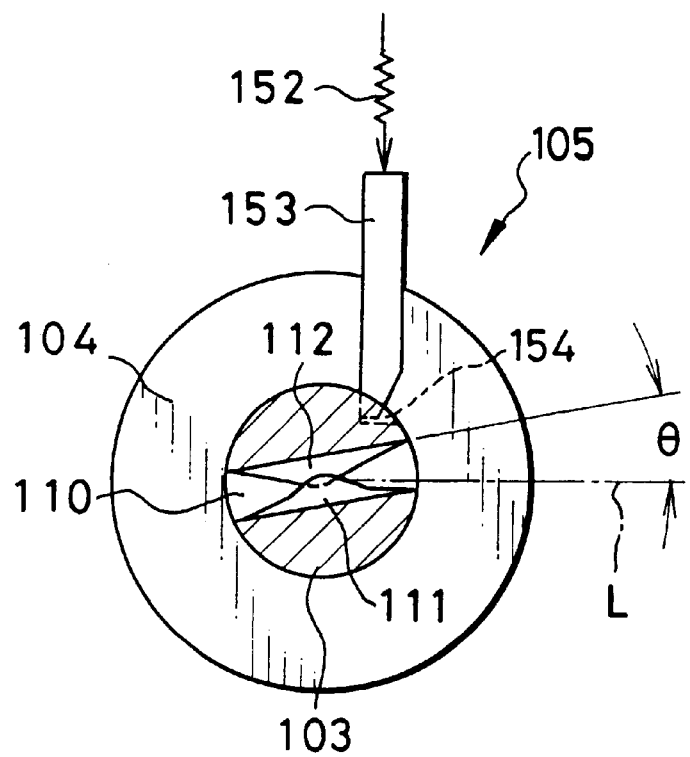
FIG. 12 is an explanatory view partially in section, illustrating a state where the spool is rotationally oriented by the spool position setter.
Figure 15:
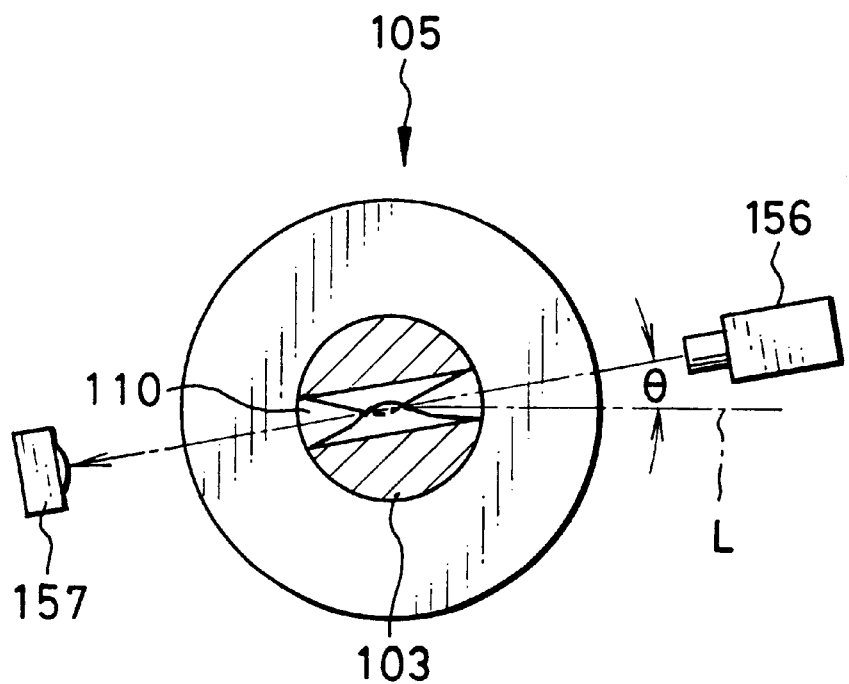
FIG. 15 is an explanatory view partially in section, illustrating one embodiment in which a spool position setter includes a photo sensor.

While the spool 105 makes one rotation, the detection cutout 154 becomes confronted with the contact claw 153. In FIG. 12, the contact claw 153 is caused by the bias of the spring 152 to enter the detection cutout 154. There is a torque limiter (not shown), which is connected between a spool drive-shaft and a motor for driving the same, and causes the motor to rotate in a free manner from the spool drive shaft when a load over a limit is applied to the spool drive shaft. While the spool 105 is stopped and engaged with the contact claw 153, the motor finishes making the one rotation to stop, so as to set the position of the spool 105 completely. After the spool 105 is positioned, an inner face 110b of a slit 110 of the spool 105 defines an inserting angle θ relative to a line L, which is defined radially to pass a center of the spool 105 and a shaft 149 of a spool turret 140.

Figure 13:
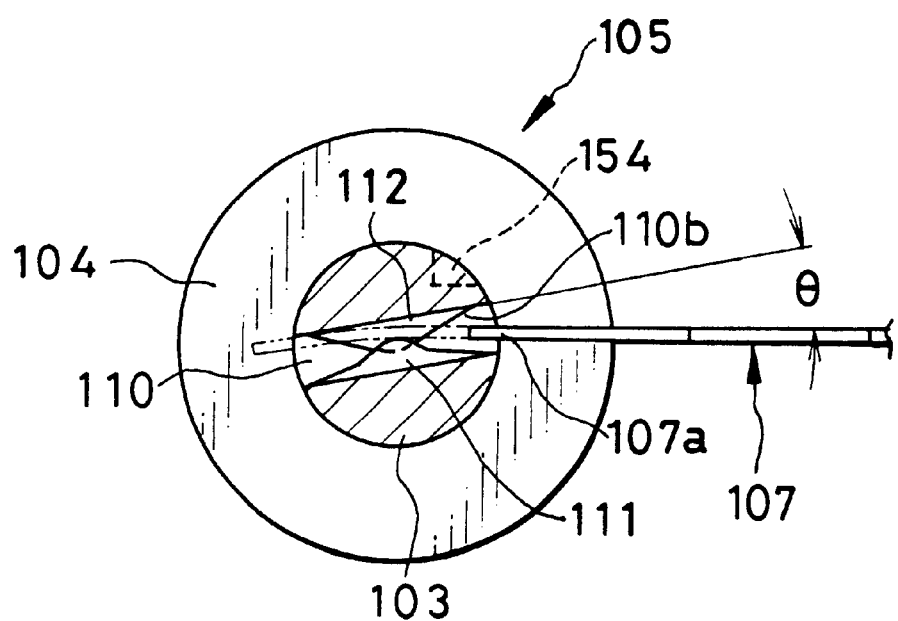
FIG. 13 is an explanatory view partially in section, illustrating a state where a front end of the light-shielding sheet is inserted in a core of the spool.
Figure 10:
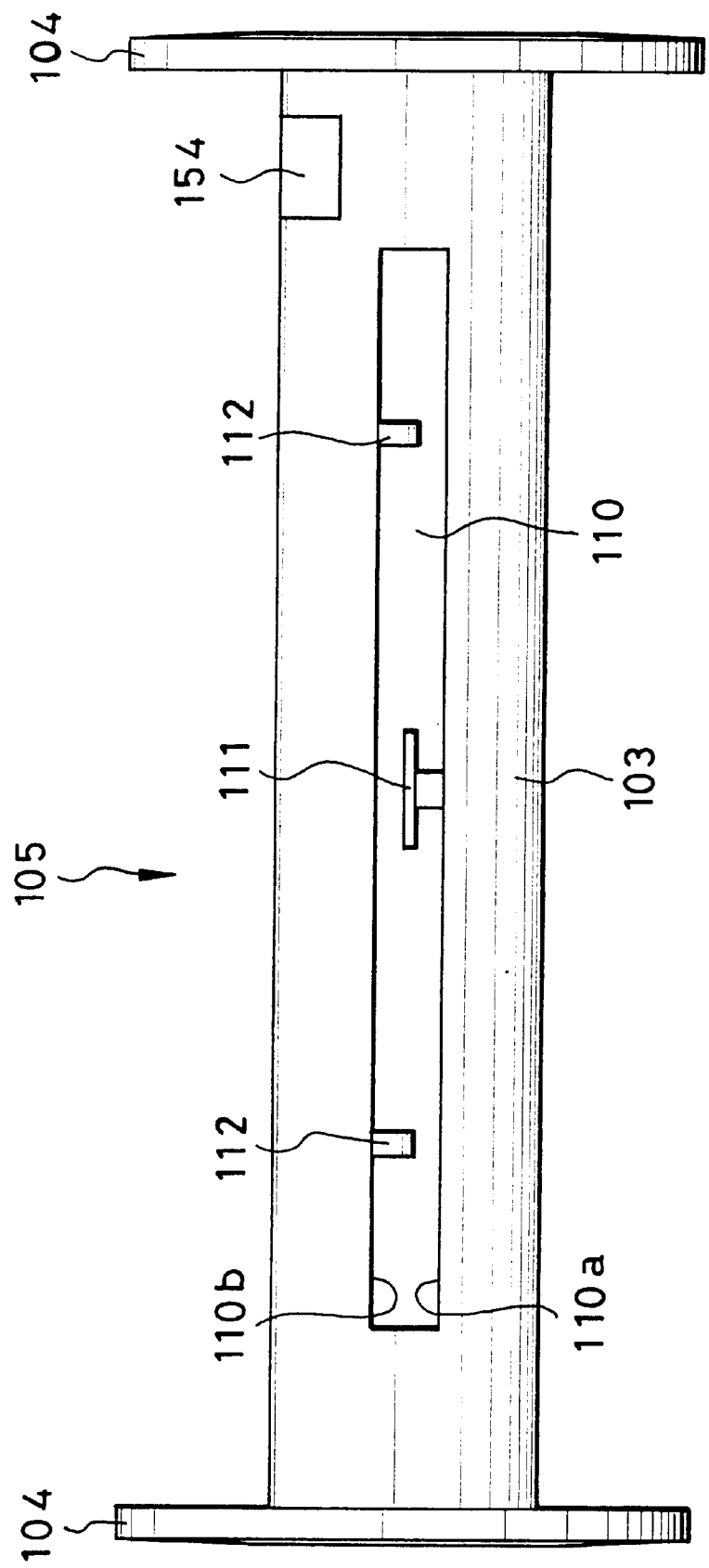
FIG. 10 is a front elevation illustrating a spool included in a roll photo film.
Figure 11:
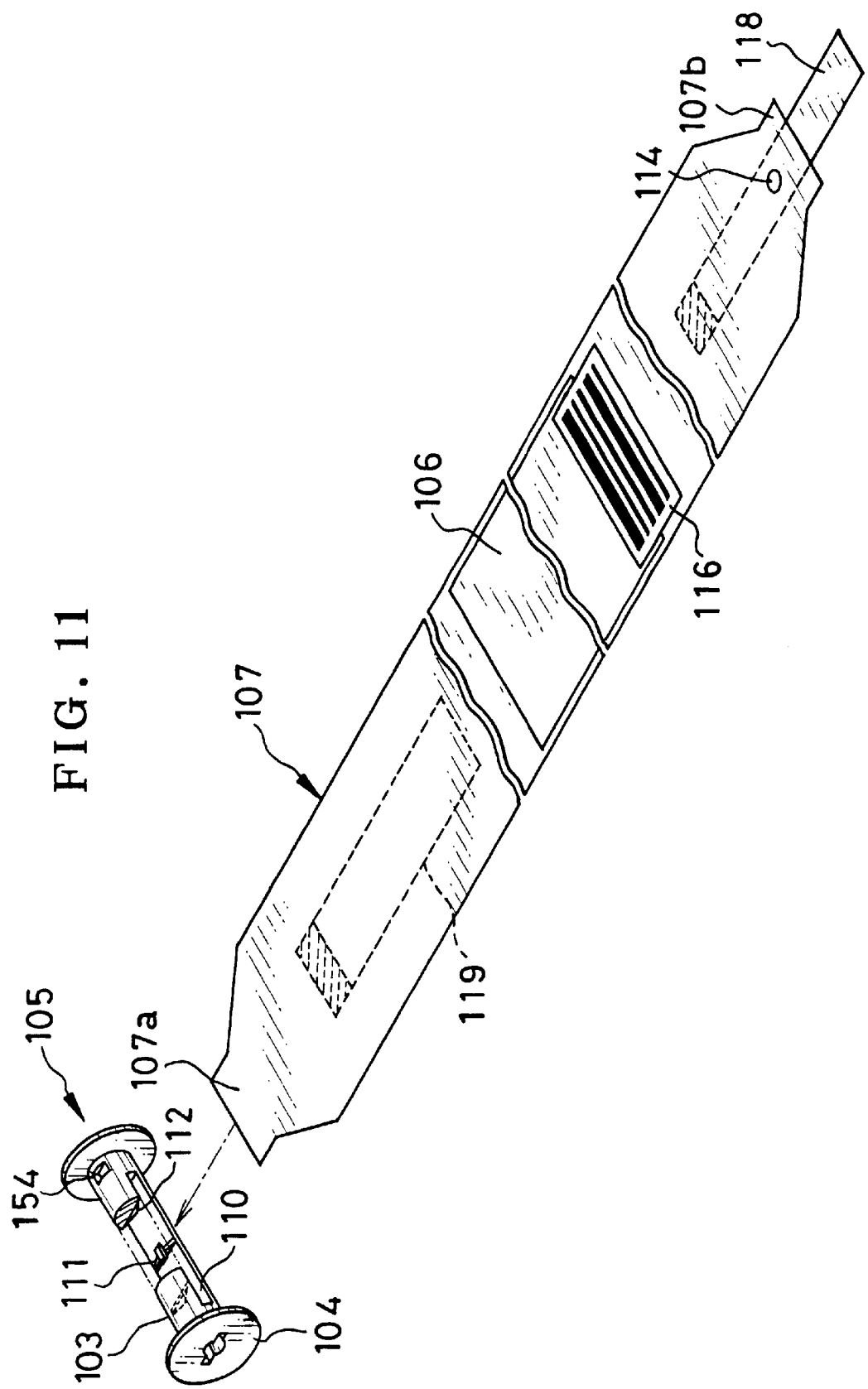
FIG. 11 is an exploded perspective illustrating a photo filmstrip and other parts of the roll photo film.

In station ST3, a front end 107a of a light-shielding sheet 107 is inserted into the slit 110 of the spool 105 by operation of inserter roller set 137 or inserter unit including two rollers for conveyance. The spool 105 is moved from station ST2 to station ST3 by rotation of the spool turret 140 by 45 degrees. In FIG. 13, the inner face 110b of the spool 105 is kept at the inserting angle θ relative to line L lying the center of the spool 105 and the shaft 149. The front end 107a of the light-shielding sheet 107 having been conveyed through a sheet conveying path 134 enters the slit 110 at the angle θ relative thereto. The front end 107a is inserted in the slit 110 while moved in contact with the inner face 110b. Thus no failure in the insertion occurs. The front end 107a is not blocked by a push claw 111.

In station ST3, a spool rotation unit 143 for winding the photo film rotates the spool 105 in the winding direction to wind the light-shielding sheet 107 and a photo filmstrip 106 about the core 103. In station ST4, a sheet bender bends or folds a rear end 107b inwards while keeping the rolled shape of the light-shielding sheet 107 about the spool 105 from being unwound.

In station ST5, a closing seal attacher attaches a closing seal or tape 118 about the rolled shape of the light-shielding sheet 107. In station ST6, a roll photo film being finished is inspected by an inspector for its contour and appearance. In station ST7, the roll photo film is removed from the spool holder 150 and exited to an exit path.

EXAMPLE

Figure 14:
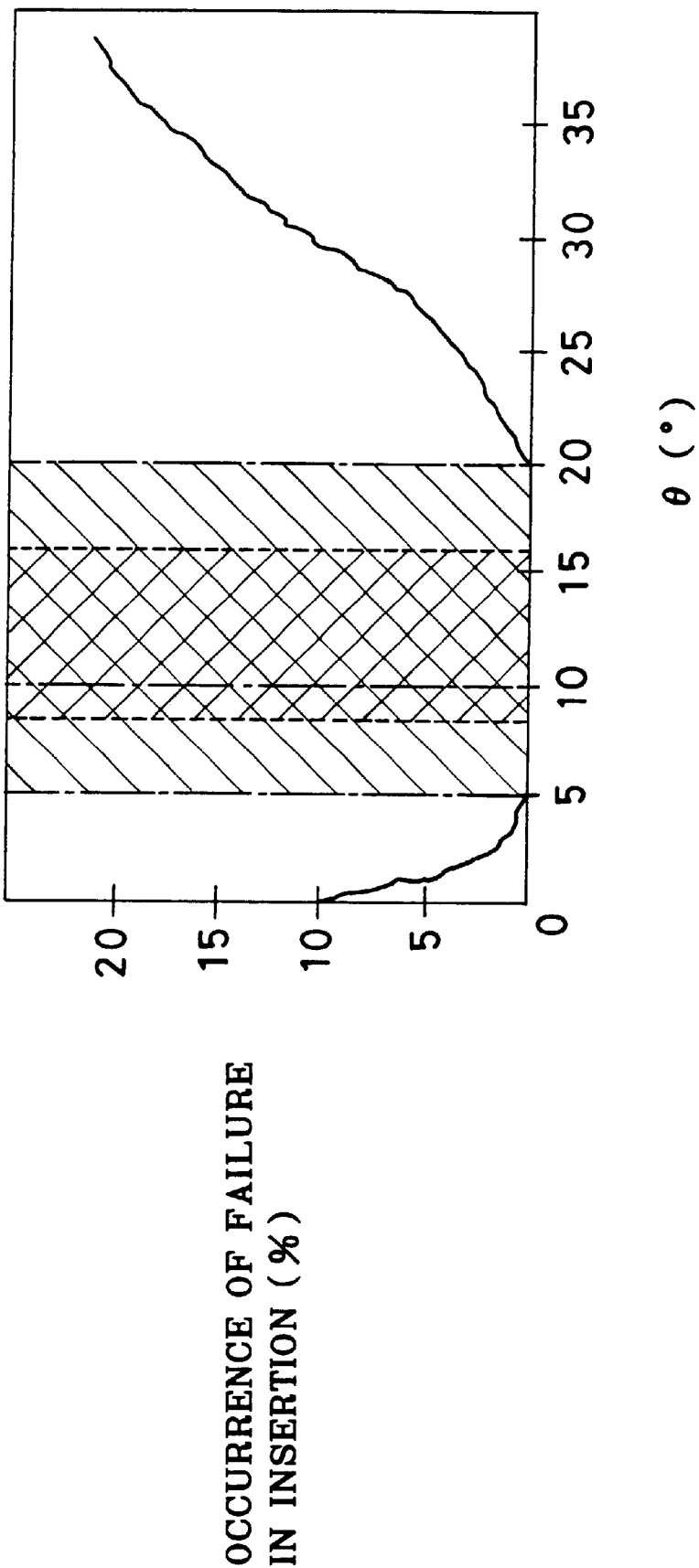
FIG. 14 is a graph illustrating a relationship between an angle θ of the front end and a percentage of failure in insertion.
Figure 16:
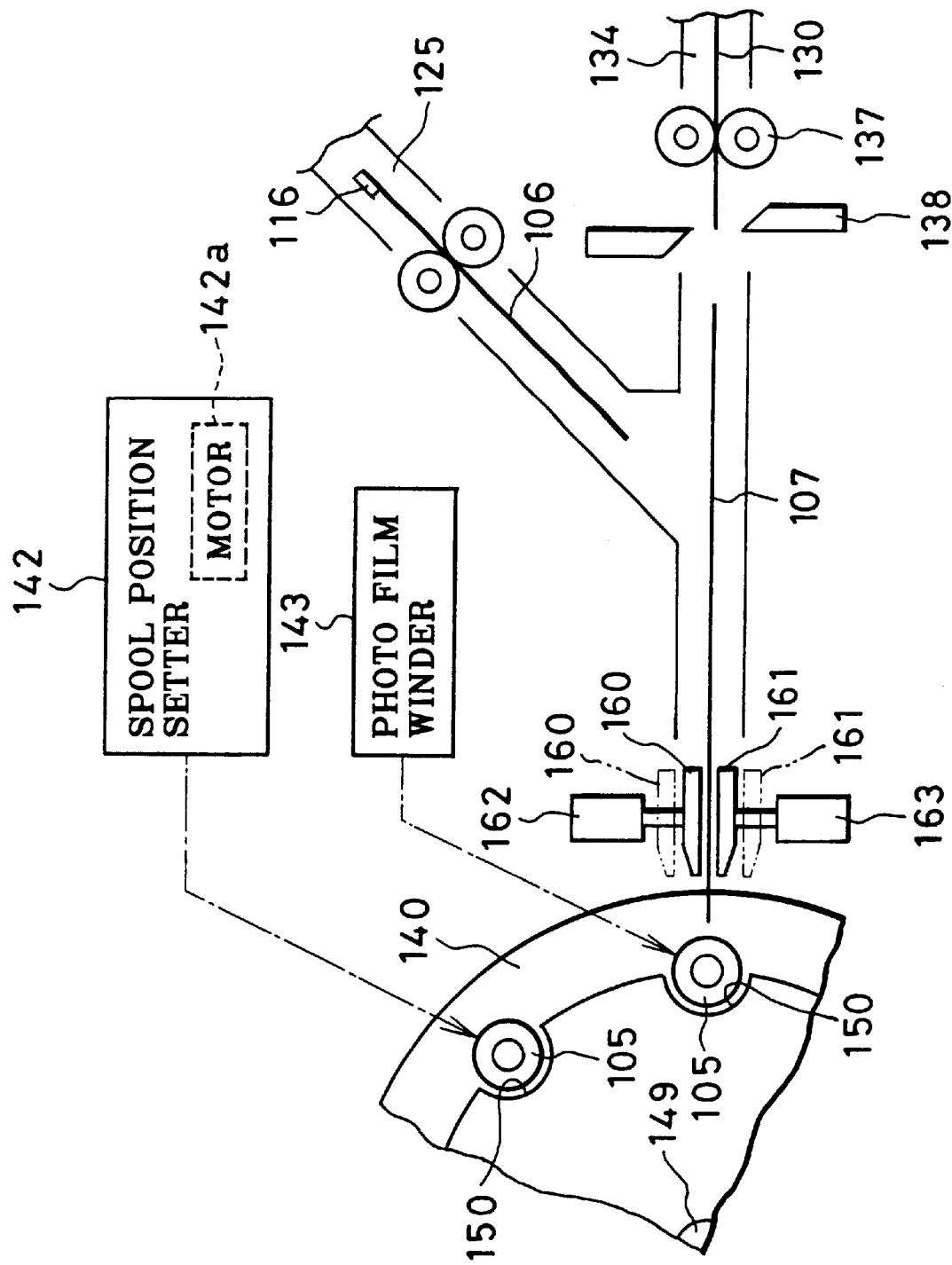
FIG. 16 is a schematic view, partially cutaway, illustrating a producing apparatus having inserter plates for guiding the insertion of the light-shielding sheet.
Figure 17:
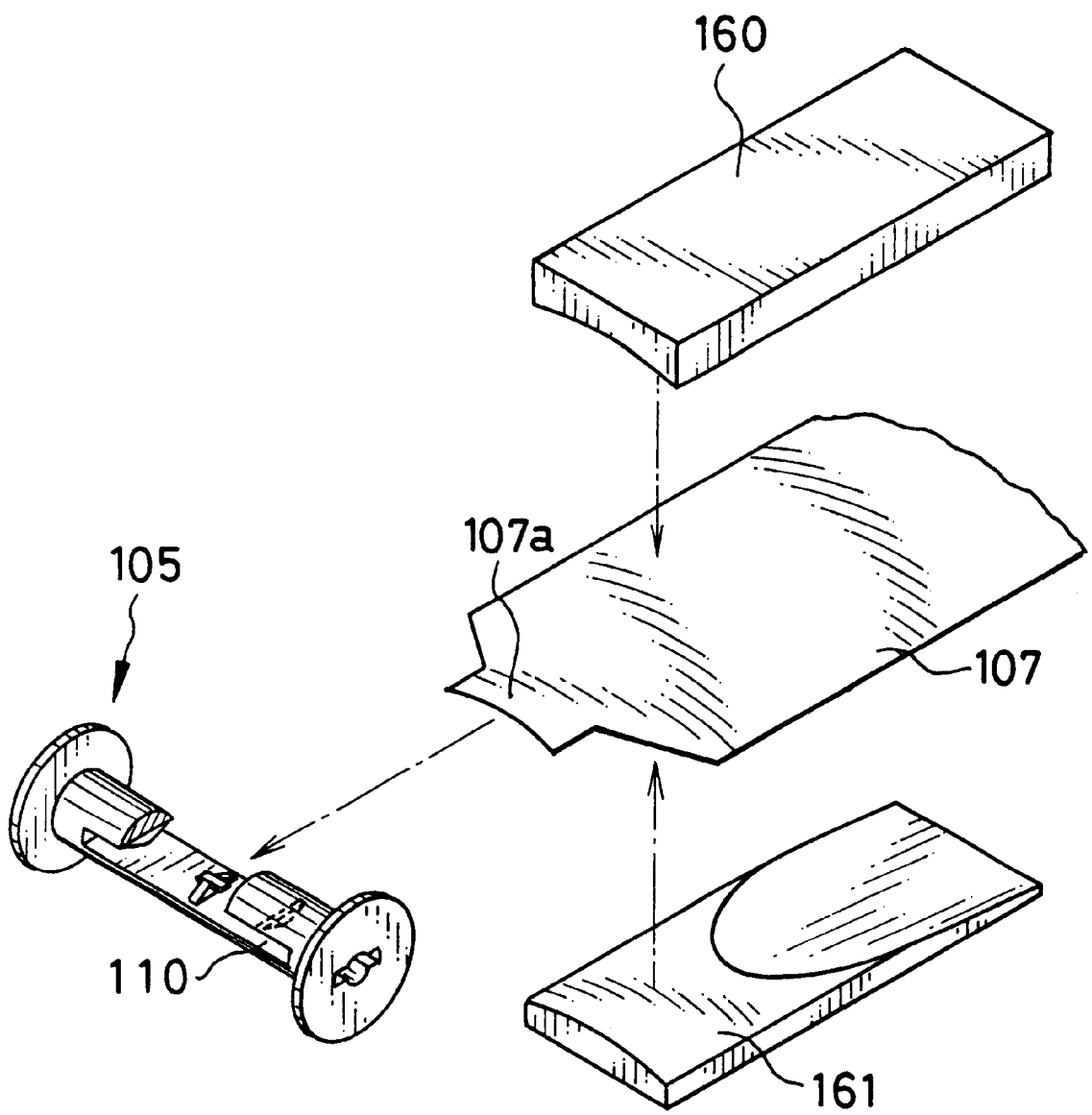
FIG. 17 is an exploded perspective illustrating the inserter plates.

Experiments were conducted while changing the inserting angle θ of the light-shielding sheet 107 relative to the slit 110. FIG. 14 is a graph illustrating percentage of occurrence of failure in the insertion results of the experiments. As is observed from the graph, the occurrence of failure was substantially reduced to zero (0) % when θ was in a range of. 5–20°, and was completely avoided when θ was in a range of 7–16°. It is concluded that the inserting angle θ in the insertion of the light-shielding sheet 107 in the slit 110 may be 5–20°, preferably can be 7–16°, and desirably can be 10°.

In the above embodiment, the spool 105 is rotationally positioned by engagement of the contact claw 153 with the detection cutout 154 formed in the core 103. Alternatively a photoelectric sensor in FIG. 15 may be used. The sensor includes a light projector 156 and a light receiver 157, and constitutes a stop control device. The spool 105 is set between the light projector 156 and the light receiver 157. The light projector 156 projects an inspecting beam, which is received by the light receiver 157 to generate a detecting signal. The spool 105 is rotationally stopped when the detecting signal is maximum to represent passage of the entirety of the inspecting beam through the slit 110. Thus the spool 105 can be positioned in a manner similar to the above embodiment.

In the above embodiment, the spool 105 is so positioned rotationally that the inner face 110b of the slit 110 of the spool 105 defines an inserting angle θ relative to line L, which is defined radially to pass a center of the spool 105 and the shaft 149 of the spool turret 140. Alternatively, the spool 105 may be positioned to set the inner face 110b in parallel with line L. The light-shielding sheet 107 can be advanced at the angle θ relative to the inner face 110b being parallel with line L.

Figure 18:
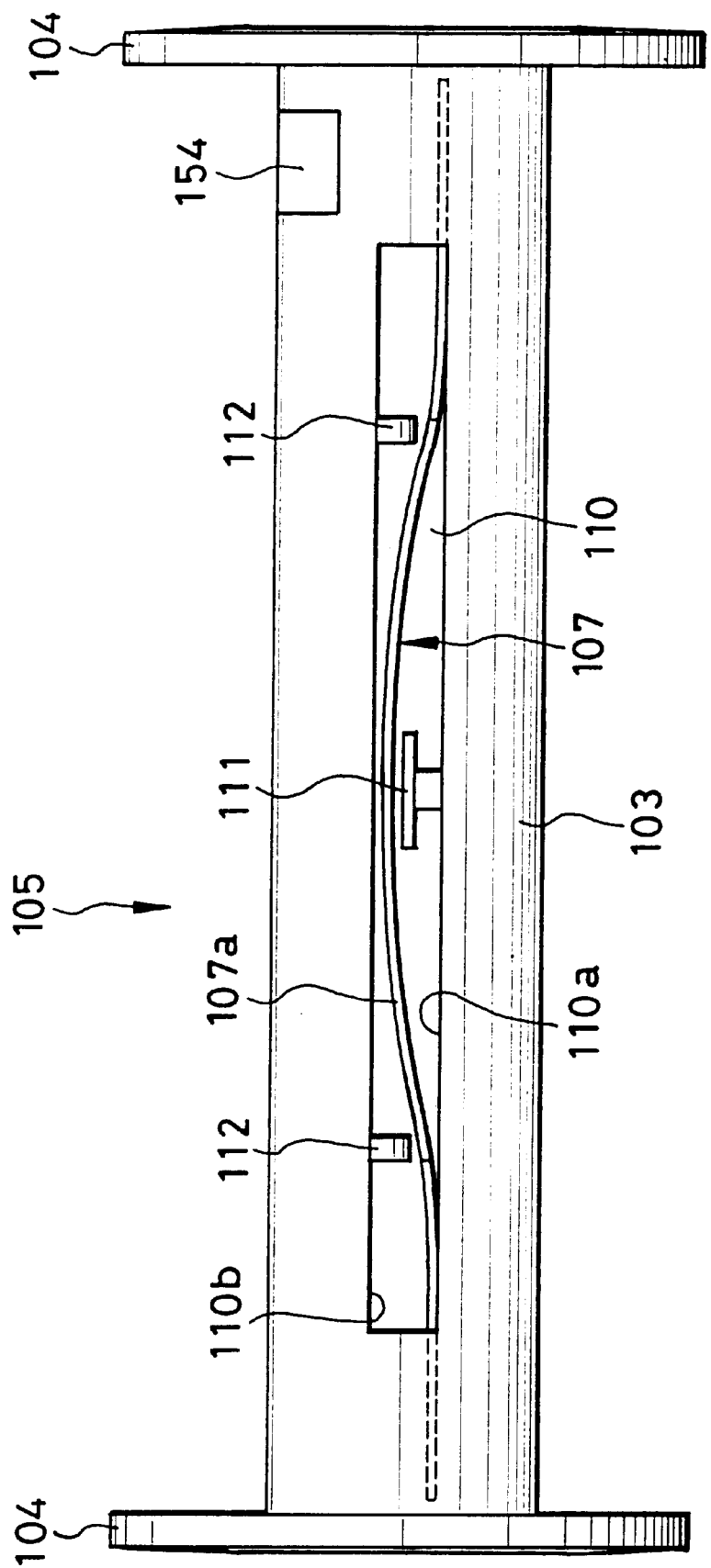
FIG. 18 is a front elevation illustrating the spool with the front end.

If the front end 107a of the light-shielding sheet 107 has a width greater than an interval between ridges 112 of the spool 105, the lateral edges of the light-shielding sheet 107 is blocked by the ridges 112. Failure in the insertion is likely to occur. To solve this problem, it is preferable to use inserter guide plates 160 and 161 of FIGS. 16 and 17. The inserter guide plates 160 and 161 are disposed in a downstream position of the sheet conveying path 134 and near to the spool turret 140, and contact the light-shielding sheet 107 between their guide surfaces to curve it in a shape of an archway. In FIG. 18, the front end 107a of the light-shielding sheet 107 is inserted in the slit 110 through a position away from the push claw 111 and the ridges 112. Thus no failure occurs in the insertion.

The inserter guide plates 160 and 161 are supported on respective solenoids 162 and 163. After the front end 107a of the light-shielding sheet 107 is inserted in the slit 110, the inserter guide plates 160 and 161 are moved away from the light-shielding sheet 107 as indicated by the phantom lines in the drawing. Thus the photo filmstrip 106 can be protected from being scratched.

Note that, in the embodiment with the inserter guide plates 160 and 161, the spool 105 in station ST2 should be positioned to set the inner face 10b in parallel with line L lying on the center of the spool 105 and the shaft 149.

Note that the roll photo film is a 120 type in accordance with the above embodiment, but may be a 220 type or any other type in the present invention.

Referring to FIGS. 19–24, another preferred embodiment is described now, in which inconsistency between parts constituting a roll photo film, if there is any, can be detected in the course of manufacture.

Figure 19:
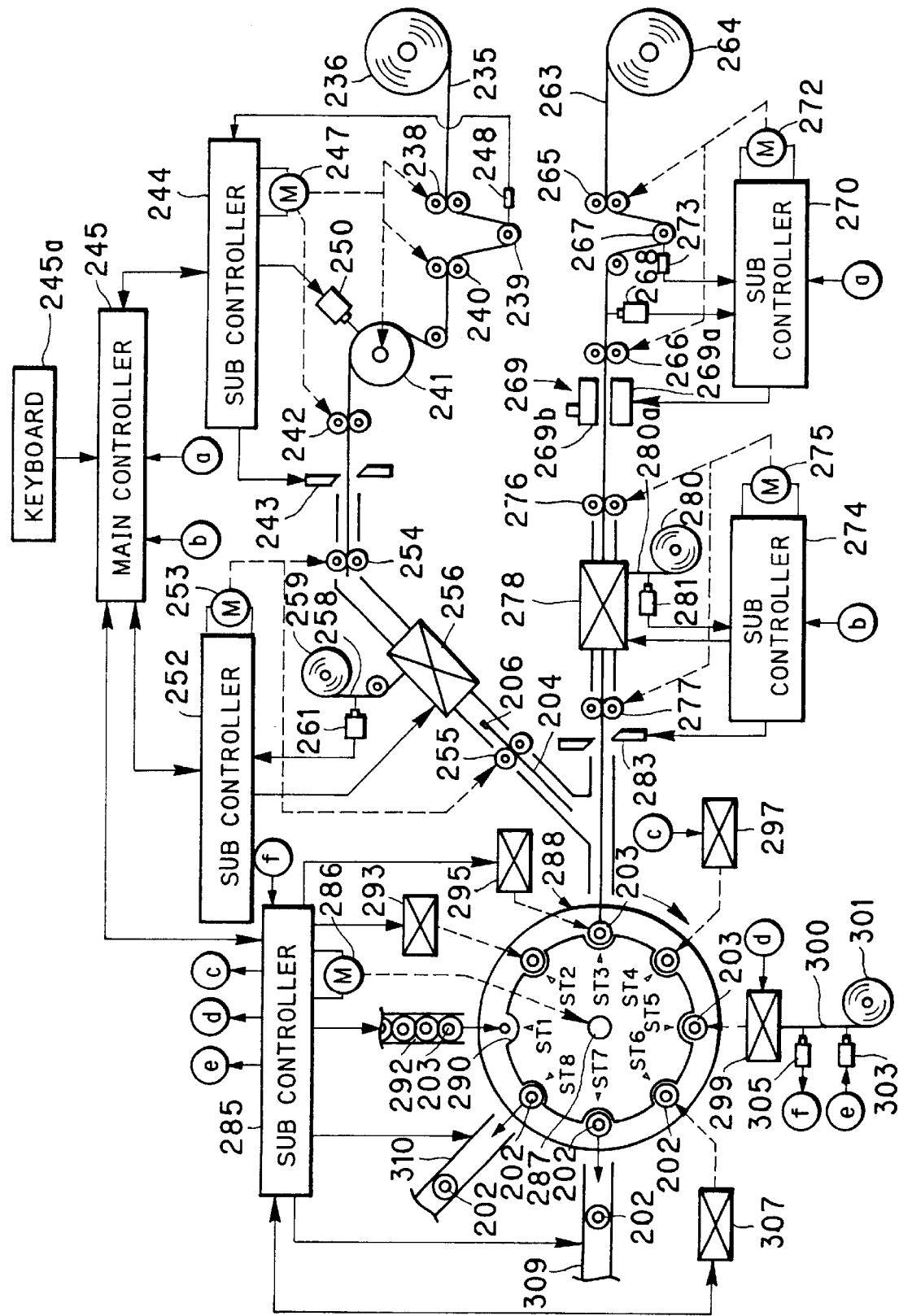
FIG. 19 is a schematic view illustrating another preferred producing apparatus in which inconsistency between parts of a roll photo film can be eliminated.
Figure 20:
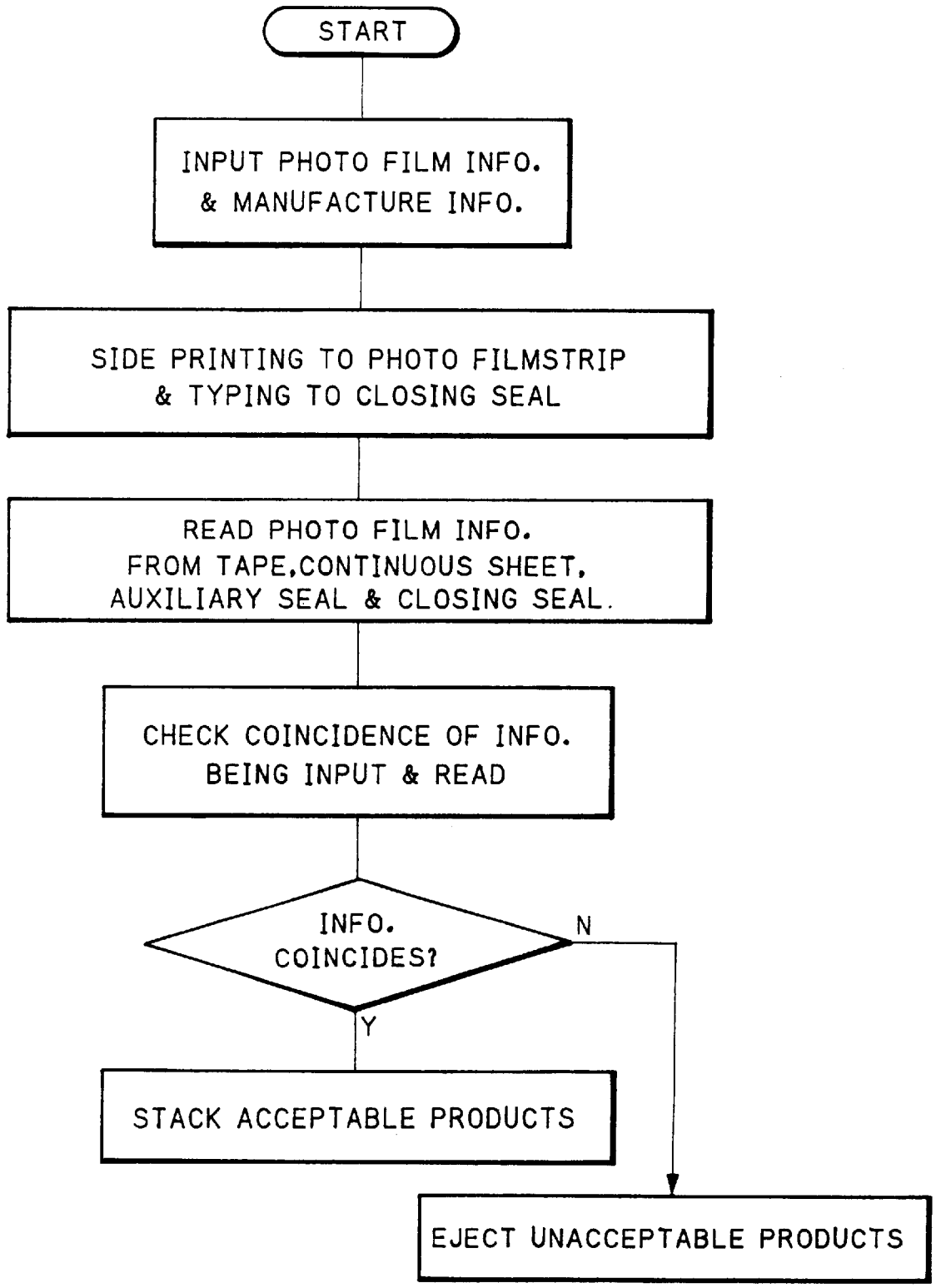
FIG. 20 is a flow chart illustrating a flow of detecting the inconsistency.
Figure 21:
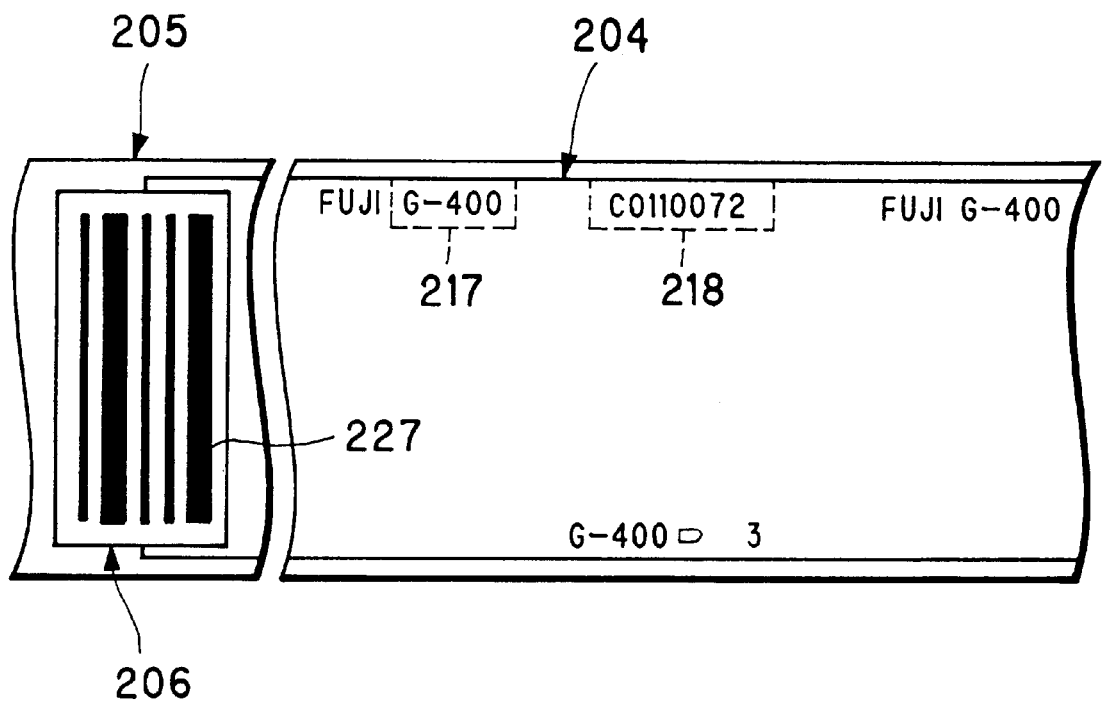
FIG. 21 is a plan, partially broken, illustrating a photo filmstrip and an adhesive tape.

To produce a roll photo film 202 in a producing system of FIG. 19, operators in a factory set various materials to be combined for the roll photo film 202. A roll 236 of continuous photo film is set in a start station of a photo film supply line. A tape roll 259 with release paper or liner paper being peelable is set in a tape attacher unit 256. A sheet roll 264 of continuous light-shielding sheet is set in a start station of a sheet supply line. A seal roll 280 with release paper or liner paper being peelable is set in a seal attacher unit 278. A great number of spools 203 is set in a spool supplier 292. A seal roll 301 of release paper or liner paper being peelable is set in a seal winder unit 299.

An operator manually inputs a product name as photo film information and a serial number as manufacture information. The product name and the serial number are used for side printing to continuous photo film 235 and typing to a closing seal 207. Also the operator inputs a start command to a main controller 245 for starting the producing operation.

A sub controller 244 is controlled by the main controller 245, and causes a motor 247 to rotate a conveyor roller set 238 including two rollers. The conveyor roller set 238 rotates in nipping the continuous photo film 235, to pull the continuous photo film 235 from the roll 236. A movable roller 239 is moved downwards by a bias of a spring, and detected by a sensor 248. A signal generated by the sensor 248 is sent to the sub controller 244, which causes the conveyor roller set 238 to stop rotating, and causes a conveyor roller set 240 including two rollers to rotate. The movable roller 239 being moved has reserved a portion of the continuous photo film 235 by a predetermined length. Now the continuous photo film 235 is conveyed to a suction drum 241.

The continuous photo film 235 conveyed by the suction drum 241 is kept in tight contact with its peripheral face by operation of the air suction of the suction drum 241. Thus the continuous photo film 235 is conveyed without incident of slipping. The product name and the serial number having been input through the main controller 245 is converted to printing data by the sub controller 244. A side printing head 250 as side printing unit is driven according to the printing data, and side-prints information to lateral edges of the continuous photo film 235 being conveyed. The information being side-printed includes a product name 217 as photo film information, a serial number 218 as manufacture information, and a series of frame numbers.

The continuous photo film 235 after the side printing is conveyed by a conveyor roller set 242 including two rollers toward a photo film cutter 243. The photo film cutter 243 receives a command from the sub controller 244, and cuts the continuous photo film 235 by a length associated with the predetermined number of available frames, to obtain a photo filmstrip 204 having this length.

The photo filmstrip 204 is conveyed toward the tape attacher unit 256 by a conveyor roller set 254 including two rollers, which are controlled by a sub controller 252 and caused to rotate by a motor 253. In the tape attacher unit 256, release paper or liner paper being peelable 258 with adhesive tape 206 is pulled from the tape roll 259. The adhesive tape 206 is separated from the liner paper 258, and attached to a rear end of the photo filmstrip 204. Note that the rear end of the photo filmstrip 204 becomes a photo film leader when the roll photo film 202 is finished. The photo filmstrip 204 with the adhesive tape 206 is temporarily retained by a conveyor roller set 255 including two rollers.

In the tape attacher unit 256, a bar code 227 as photo film information is read by a bar code reader unit 261 from the adhesive tape 206 drawn from the tape roll 259. The bar code reader unit 261 outputs a signal according to reading of the bar code 227, and sends it to the sub controller 252. The sub controller 252 converts the signal according to the bar code 227 into photo film information, which is sent to the main controller 245.

The sheet supply line is operated at the same time as the photo film supply line. A sub controller 270 is controlled by the main controller 245, and causes a motor 272 to rotate a conveyor roller set 265 including two rollers. The conveyor roller set 265 squeezes continuous light-shielding paper 263, and rotates to pull the continuous light-shielding sheet 263 from the sheet roll 264. A movable roller 267 is moved downwards by a bias of a spring, and detected by a sensor 273. A signal generated by the sensor 273 is sent to the sub controller 270, which causes the conveyor roller set 265 to stop rotating, and causes a conveyor roller set 266 including two rollers to rotate. The movable roller 267 being moved has reserved a portion of the continuous light-shielding sheet 263 by a predetermined length. Now the continuous light-shielding sheet 263 is conveyed to a trimmer unit 269.

In the conveyance to the trimmer unit 269, photo film information 222, 223, 224 and 225 on the continuous light-shielding sheet 263 is picked up by a CCD (charge-coupled device) camera 268 or reader unit. Pick-up data from the CCD camera 268 is sent to the sub controller 270, which converts the pick-up data into letter data. The sub controller 270 refers to storage of photo film information, and a portion of the stored information associated with the letter data is input to the main controller 245.

In the trimmer unit 269, a punch 269b is moved down and squeezes the continuous light-shielding sheet 263 between it and a die 269a, and operates to trim portions of the continuous light-shielding sheet 263 to become a rear end 205a and a front end 205b of a light-shielding sheet 205, both in a narrowed shape. Also the trimmer unit 269 forms a retaining hole 220. See FIG. 4.

The continuous light-shielding sheet 263 after the trimming operation in the trimmer unit 269 is conveyed to the seal attacher unit 278 by a conveyor roller set 276 including two rollers. The seal attacher unit 278 pulls out a release paper or liner paper being peelable 280a to which a great number of auxiliary seals 208 have been previously attached. The auxiliary seal 208 is peeled from the liner paper 280a, and attached to a surface of the continuous light-shielding sheet 263.

In the seal attacher unit 278, a product name 232 and a process number 233 are picked up by a CCD camera 281 or reader unit from a surface of the auxiliary seal 208 pulled out of the seal roll 280. The CCD camera 281 outputs pick-up data to a sub controller 274, which converts the pick-up data into letter data. The sub controller 274, refers to storage of photo film information, and a portion of the stored information associated with the letter data is input to the main controller 245.

A spool supply line starts operating at the same time as the photo film supply line and the sheet supply line. A sub controller 285 is controlled by the main controller 245, and causes a motor 286 to rotate a spool turret 288 about a shaft 287 in a clockwise direction.

The spool turret 288 being rotated, an empty one of spool holders 290 is stopped at station ST1. The spool 203 supplied from the spool supplier 292 is set in the spool holder 290. Then the spool turret 288 rotates to transfer the spool holder 290 with the spool 203 to station ST2. A spool position setter 293 sets a rotational position of a slit (See FIG. 2) in the spool 203 in one direction.

When the spool 203 of which the slit is rotationally positioned is transferred to station ST3, the front end 205b of the continuous light-shielding sheet 263 is inserted in the slit after being conveyed by a conveyor roller set 277 including two rollers. After this insertion of the front end 205b, the continuous light-shielding sheet 263 is cut by a sheet cutter 283 to obtain the light-shielding sheet 205. Then a winder 295 causes the spool 203 to make a few rotations in the winding direction, to wind the front end 205b of the light-shielding sheet 205 about the spool 203.

A small portion of the light-shielding sheet 205 is wound about the spool 203. Then the photo filmstrip 204 is conveyed from the photo film supply line by the conveyor roller set 255, and overlapped on a back of the light-shielding sheet 205. The winder 295 rotates the spool 203 further in the winding direction, to wind the entirety of the light-shielding sheet 205 and the photo filmstrip 204 about the spool 203. The adhesive tape 206, having been placed on the end of the photo filmstrip 204, is attached to the back of the light-shielding sheet 205, to keep the photo filmstrip 204 secured to the light-shielding sheet 205.

The spool 203, on which the photo filmstrip 204 and the light-shielding sheet 205 are wound in station ST3, is transferred to station ST4 by rotation of the spool turret 288 while the rolled shape of the light-shielding sheet 205 is pushed and kept from being unwound. In station ST4, a sheet bender 297 bends or folds the rear end 205a of the light-shielding sheet 205 inwards.

In station ST5, the seal winder unit 299 draws release paper or liner paper 300 being peelable with the closing seal 207 from the seal roll 301, and separates the closing seal 207 from the liner paper 300 to wind the closing seal 207 about the light-shielding sheet 205.

On the closing seal 207 while conveyed from the seal roll 301 to the seal winder unit 299, a serial number 230 or lot number as manufacture information is typed by a typing head 303 or character printer unit for printing letters, numerals, and/or other typewritten signs in accordance with printing data input from the sub controller 285. For this printing data, the serial number has been input to the main controller 245 as manufacture information. The serial number has been converted by the sub controller 285 into this printing data.

Between positions of the typing of the serial number and of winding of the closing seal 207, there is a CCD camera 305 or reader unit for picking up a product name 229 as photo film information of the closing seal 207. The CCD camera 305 outputs pick-up data to the sub controller 285, which converts the pick-up data into letter data. The sub controller 285 refers to storage of photo film information, and a portion of the stored information associated with the letter data is input to the main controller 245.

The roll photo film 202 with the closing seal 207 wound thereabouts is transferred by the spool turret 288 to station ST6. In station ST6, an inspector unit 307 measures a diameter of the roll photo film 202. Information of a measured diameter is sent from the sub controller 285 to the main controller 245, and stored.

The main controller 245 checks coincidence of the information being input and read, the information including the photo film information and the manufacture information having been input for the side printing and the typing, and the photo film information read from the adhesive tape, the continuous light-shielding sheet, the auxiliary seal and the closing seal. The result of the checking is stored by the main controller 245. If the information does not coincide, the main controller 245 indicates an alarm with light or sound, and displays indication to inform an operator of the result. The operator visually recognizes the indication, and stops the producing apparatus to exchange incorrectly supplied parts of the roll photo film.

The roll photo film 202 transferred to station ST7, if not acceptable, is removed from the spool holder 290 by an ejector unit 309 and ejected externally. Note that the roll photo film 202 is regarded as unacceptable if the measured diameter stored in the main controller 245 is above or below a tolerable range being predetermined for the roll photo film 202, and/or if there is a difference in the photo film information and the manufacture information.

If the measured diameter stored in the main controller 245 is within the tolerable range, and if coincidence is confirmed in the photo film information and the manufacture information, then the roll photo film 202 is transferred from station ST8 to an exit path 310, and conveyed to a packaging apparatus. Thus unacceptable roll photo films are prevented from being shipped. It is possible to heighten reliability in manufacturing the roll photo film 202.

Figure 22:
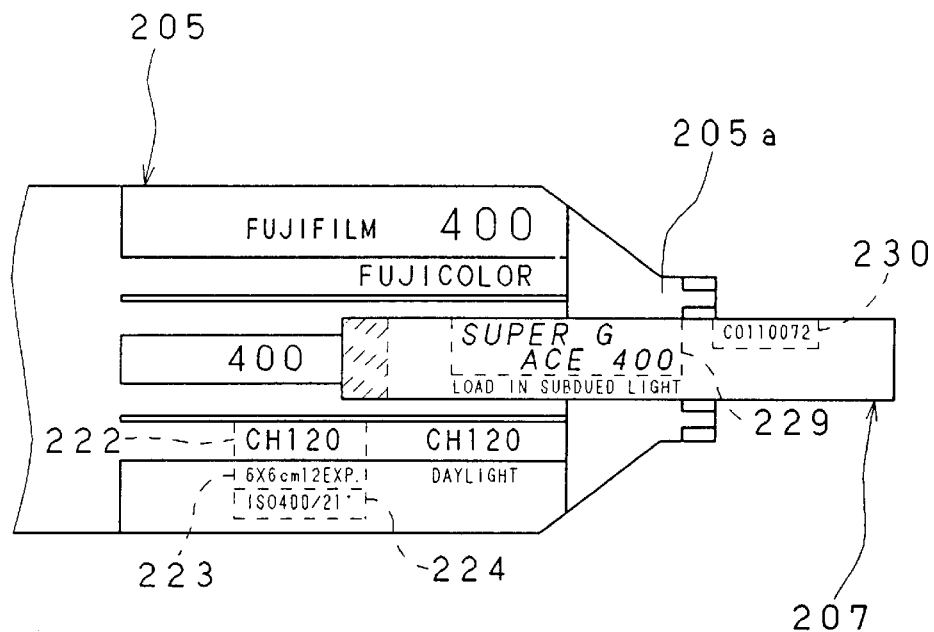
FIG. 22 is a plan, partially broken, illustrating a rear end of a light-shielding sheet with a closing seal.
Figure 23:
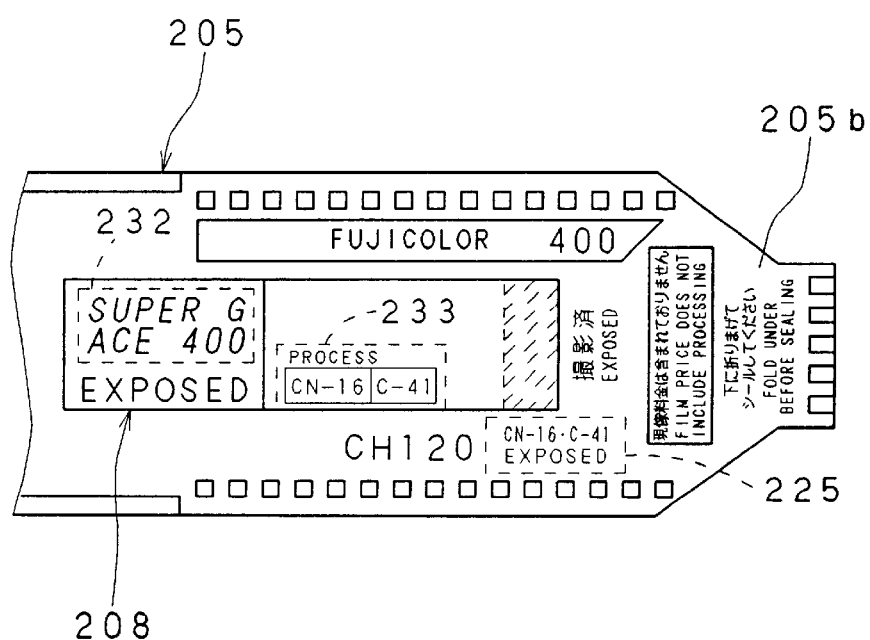
FIG. 23 is a plan, partially broken, illustrating a front end of the light-shielding sheet with an auxiliary seal.

In FIGS. 22 and 23, the photo film information 222–225 are precisely depicted. The photo film information 222 represents a type and a kind of the roll photo film 202. An example of the photo film information 222 is "CH120" representing a color negative photo film for the photo filmstrip 204 in the roll photo film 202. The photo film information 223 represents a size or length of the roll photo film 202. An example of the photo film information 223 is "6×6 cm 12 EXP", which represents that the photo filmstrip 204 is available for 12 exposures in frames of 6×6 centimeters. In other words a size or length of the roll photo film 202 is the "full size" according to the terms of photography. The photo film information 224 represents sensitivity of the , photo filmstrip 204. An example of the photo film information 224 is "ISO400/21°", which represents ISO sensitivity being 400. The photo film information 225 is the number of a process specifically recommended for the photo filmstrip 204.

Figure 24:
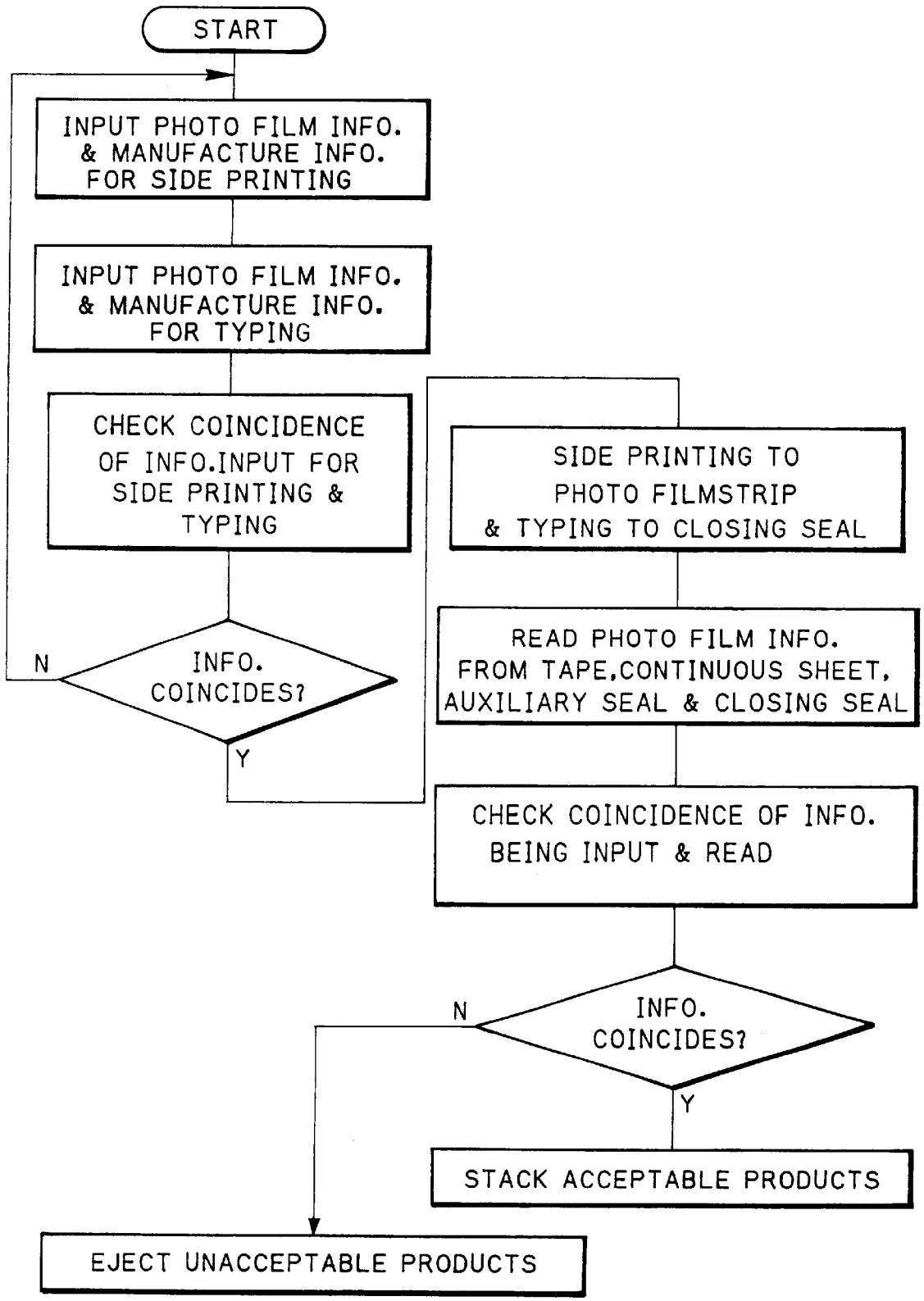
FIG. 24 is a flow chart illustrating another flow in which consistency is checked for two times.

FIG. 24 is a flow chart illustrating another preferred flow of operating the apparatus of the present invention. In the present embodiment, the photo film information and the manufacture information is input for side printing at first for the continuous photo film 235 through a keyboard 245a or manual input device. Then the manufacture information is input for typing to the closing seal 207 through the keyboard 245a. Then the main controller 245 checks coincidence of the manufacture information input for the side printing and the typing. If the information does not coincide, the main controller 245 indicates an alarm with light or sound, and informs an operator of requirement of a corrected input of the manufacture information.

If the information coincides, then the producing apparatus is normally operated to produce the roll photo film 202. The photo film information is read in the course of the production from the adhesive tape, the continuous light-shielding sheet, the auxiliary seal and the closing seal. The main controller 245 checks coincidence of the information being input and read. If the information does not coincide, the main controller 245 indicates an alarm with light or sound, and displays indication to inform an operator of the result. The roll photo film 202 transferred to station ST7 and not acceptable is removed by an ejector unit 309 and ejected externally.

A roll photo film confirmed acceptable after checking coincidence of the information is transferred from station ST8 to the exit path 310, and conveyed to a packaging apparatus succeeding to the producing apparatus. In the present embodiment, the manufacture information initially input to the main controller 245 is checked, before starting the manufacturing operation. Thus it is possible to prevent failure in printing the information or inconsistency in the printed information. Reliability of products is maintained appropriately.

Note that the roll photo film 220 is a 120 type in accordance with the above embodiments, but may be a 220 type or any other type in the present invention.

Referring to FIGS. 25–29, another preferred embodiment is described now, in which an adhesive tape can be attached between a photo filmstrip and a light-shielding sheet with heightened precision.

At first a roll of continuous photo film is set in a supply position, in a manner of FIGS. 5 and 19. The continuous photo film is pulled by an intermittent supplier intermittently by a regular length, and conveyed toward a photo film cutter unit. A side printer, during the conveyance, operates for side printing of photo film information to the continuous photo film and outside effective frames. The continuous photo film conveyed to the photo film cutter unit is cut by the regular length to become a photo filmstrip 394 of FIG. 25, which is sent to a tape attacher 329 disposed in a photo film path.

Figure 28:
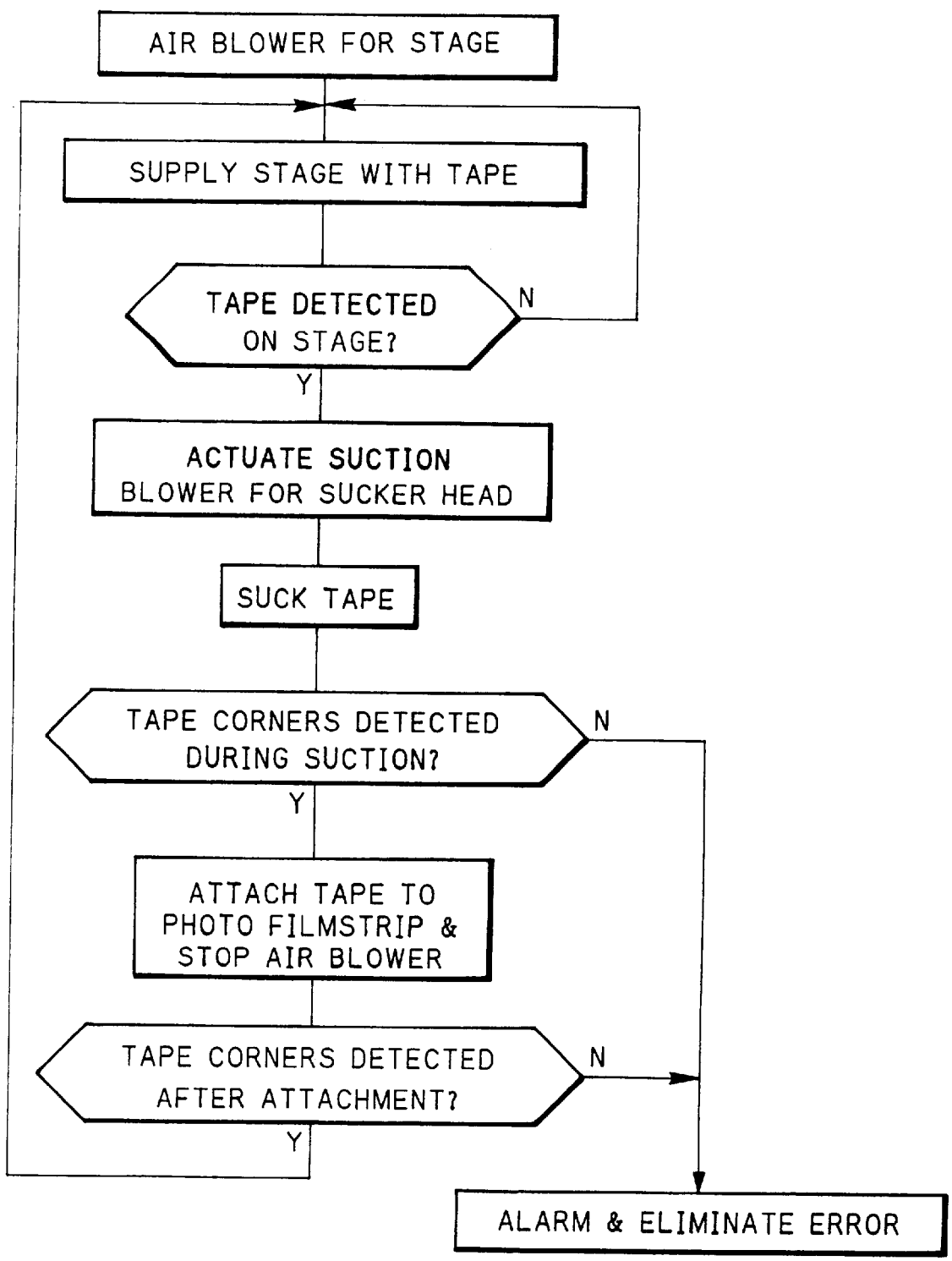
FIG. 28 is a flow chart illustrating operation of the tape attacher.
Figure 29:
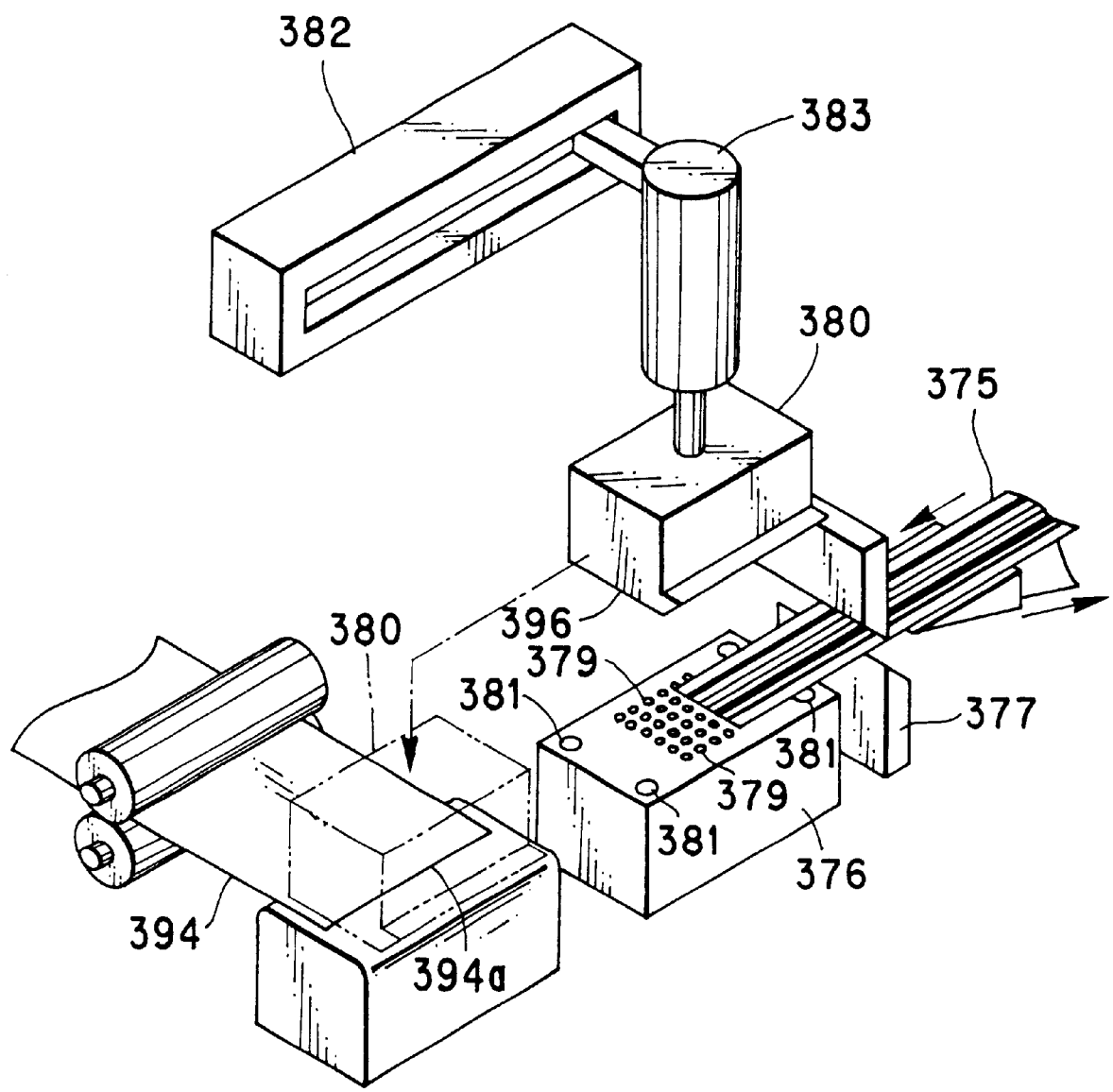
FIG. 29 is a perspective illustrating another preferred tape attacher.

In the tape attacher 329, an adhesive tape 396 is attached to a first end 394a of the photo filmstrip 394 according to a flow of FIG. 28. The photo filmstrip 394 is conveyed by a conveyor roller set 348 including two rollers to the tape attacher 329, and stopped to place the first end 394a on an attaching stage 337.

Figure 25:
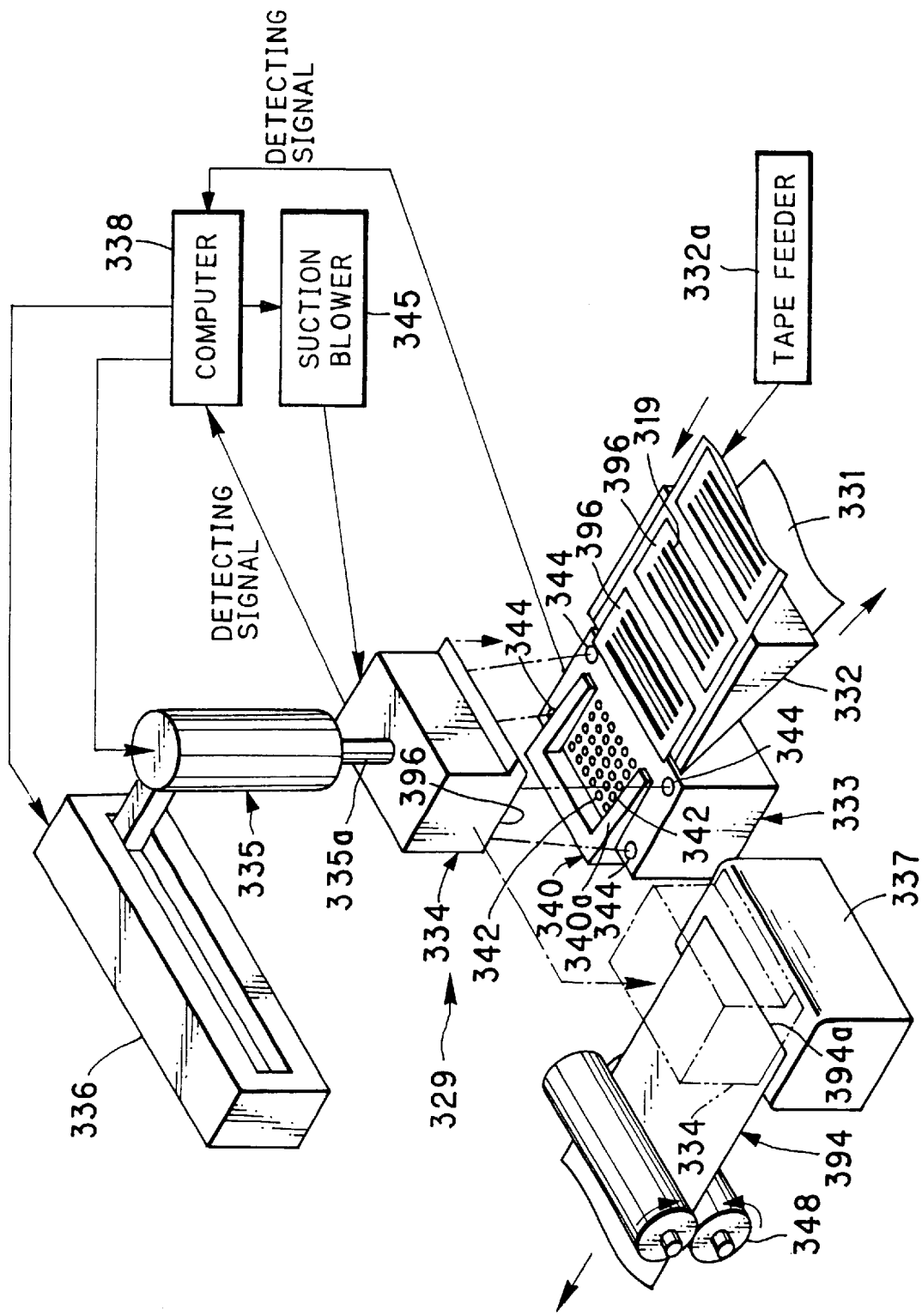
FIG. 25 is a perspective illustrating another preferred embodiment in which an adhesive tape can be accurately attached.
Figure 26:
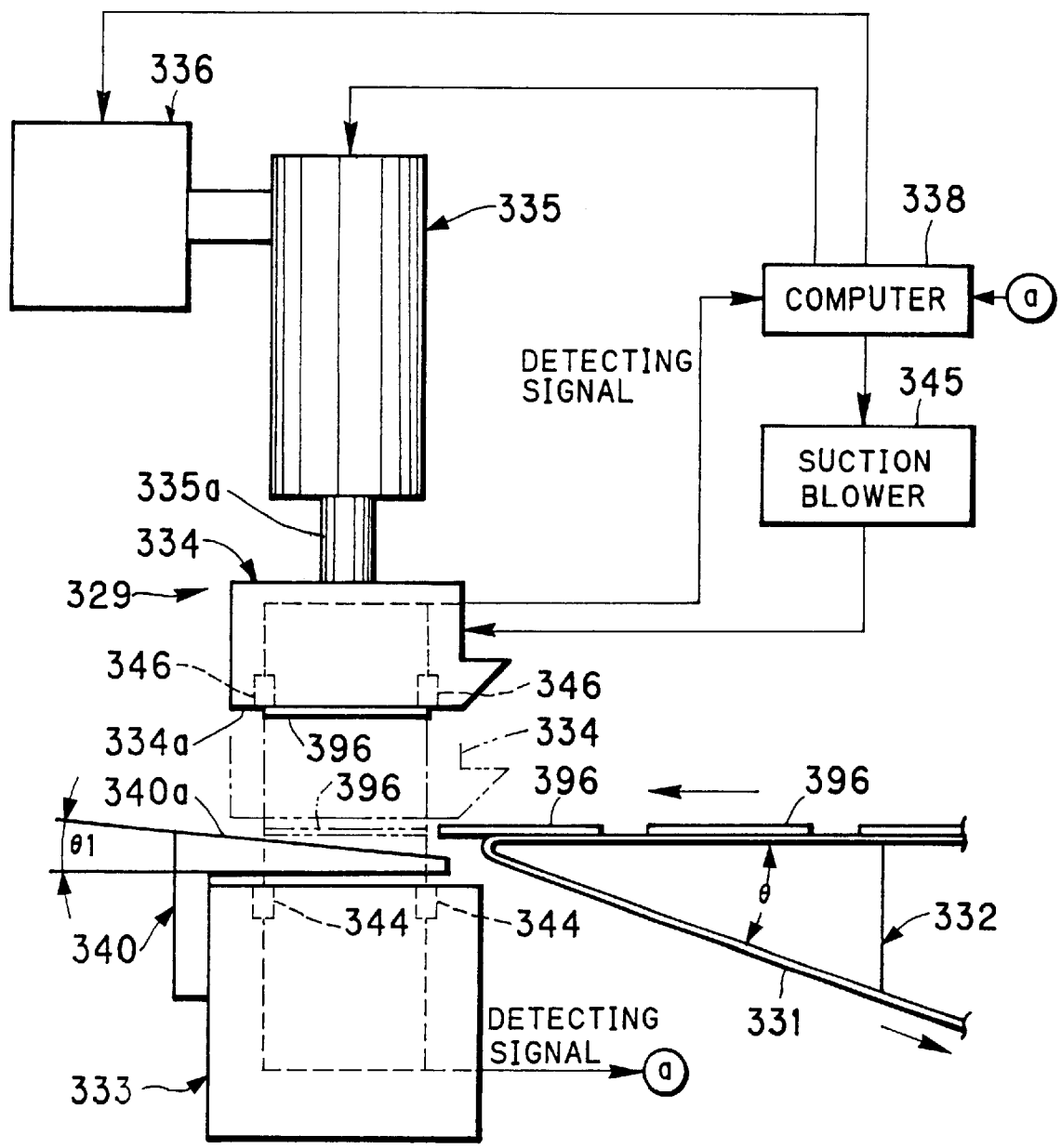
FIG. 26 is an explanatory view in elevation, illustrating a support stage in a tape attacher for initially supporting the adhesive tape.

When the photo filmstrip 394 is supplied, an air blower for a support stage 333 is actuated to blow air upwards through air discharge holes 342 formed in the support stage 333. At the same time as the air blowing, a computer 338 causes a motor to rotate a winder shaft for winding a release paper or liner paper 331 being peelable. In FIGS. 25 and 26, the liner paper 331 is moved in the arrow direction by a tape feeder 332a included in a tape supplier, to be bent with an acute angle by an edge member 332 as the tape supplier, so that the adhesive tape 396 is separated from the liner paper 331. The liner paper 331 being moved, the adhesive tape 396 is conveyed toward rails or ridges 340 in a crank-shaped portion located on the support stage 333.

The adhesive tape 396 on the support stage 333 is floated up by blowing air to its adhesive surface from the air discharge holes 342. The ridges 340 are so structured that its area in contact with the adhesive surface of the adhesive tape 396 is small, and that a surface of the ridges 340 is finished with a characteristic facilitated in separation, such as a matte finish or teflon coating. Therefore the adhesive tape 396 is conveyed to the support stage 333 without being stuck to the ridges 340.

When the adhesive tape 396 is conveyed to a predetermined position on the support stage 333, four photoelectric sensors 344 of a reflection type detect four corners of the adhesive tape 396 on the support stage 333. Detecting signals are generated by the photoelectric sensors 344, and input to the computer 338. The computer 338 actuates a suction blower 345 adapted to suction of a suction head 334, and actuates an air cylinder 335 as a head shifter unit, to cause a plunger 335a as a head slider to protrude downwards.

In FIG. 26, the suction head 334 is moved nearer to the support stage 333 as indicated by the phantom line, to suck the adhesive tape 396 located on the ridges 340. The suction head 334 with the adhesive tape 396 is moved up by the air cylinder 335 again. The photoelectric sensors 344 of the support stage 333 detect four corners of the adhesive tape 396 sucked by the suction head 334, and send detecting signals to the computer 338. If every one of the photoelectric sensors 344 detect a corner of the adhesive tape 396, the computer 338 confirms correct orientation of the adhesive tape 396 sucked by the suction head 334.

If only three or less of the photoelectric sensors 344 generates the detecting signal, then the computer 338 determines that the adhesive tape 396 sucked by the suction head 334 has a distorted orientation. The computer 338 forcibly stops the relevant sections of the producing apparatus, and raises alarm to an operator. The alarm may be indication on a monitor display, a blinking actuation of a lamp, or sound of a buzzer. The operator eliminates the improperly oriented adhesive tape from the suction head 334, and restarts the producing apparatus.

Figure 27:
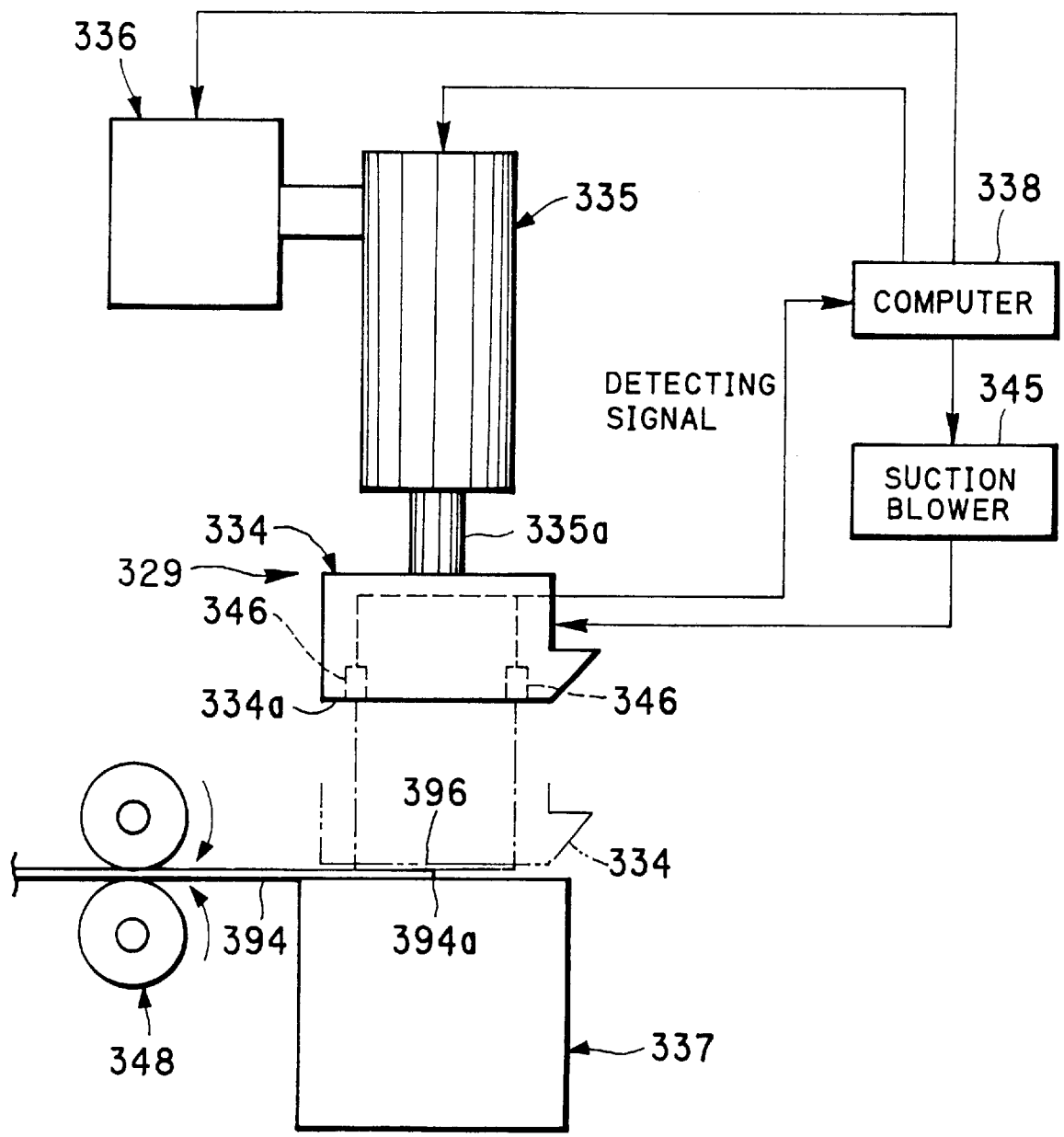
FIG. 27 is an explanatory view in elevation, illustrating an attaching stage in the tape attacher.

If the computer 338 detects the correct orientation of the adhesive tape 396 in suction to the suction head 334, then a single-shaft robot 336 included in the head shifter unit is driven to move the air cylinder 335 to a position above the attaching stage 337. The plunger 335a of the air cylinder 335 is moved down. In FIG. 27, a sucking surface 334a of the suction head 334 is caused to attach the adhesive tape 396 to the first end 394a of the photo filmstrip 394 as indicated by the phantom line. The computer 338 stops the suction blower 345 to stop the air suction through the suction head 334.

Then the computer 338 causes the air cylinder 335 to retract the plunger 335a, to move the suction head 334 up away from the attaching stage 337. The suction head 334 has stopped suction of air. The adhesive tape 396 remains attached on the first end 394a of the photo filmstrip 394.

After the suction head 334 moves upwards, four photoelectric sensors 346 of a reflection type disposed on the sucking surface 334a of the suction head 334 detect respective corners of the adhesive tape 396 remaining on the first end 394a of the photo filmstrip 394. The photoelectric sensors 346 send respective detecting signals to the computer 338. If every one of the photoelectric sensors 346 detect a corner of the adhesive tape 396, the computer 338 confirms correct orientation of the adhesive tape 396 attached to the photo filmstrip 394. The single-shaft robot 336 is driven to return the suction head 334 to a position above the support stage 333 to suck another piece of the adhesive tape 396. The photo filmstrip 394 with the adhesive tape 396 attached thereto is conveyed toward a spool supply path by rotation of the conveyor roller set 348.

If only three or less of the photoelectric sensors 346 generates the detecting signal, then the computer 338 determines that the adhesive tape 396 placed on the photo filmstrip 394 has a distorted orientation. The computer 338 forcibly stops the relevant sections of the producing apparatus, and raises alarm to an operator, in a manner similar to the above. The operator eliminates the photo filmstrip 394 with the improperly oriented adhesive tape, and restarts the producing apparatus.

Devices associated with a sheet supply path starts being operated at the same time as the above devices associated with the photo film supply path. Continuous light-shielding sheet is preset as a sheet roll, and pulled out by an intermittent supplier, and conveyed to a trimmer unit. The trimmer unit trims the continuous light-shielding sheet for portions to become ends of a light-shielding sheet. Also the trimmer unit forms a retaining hole in the continuous light-shielding sheet by punching.

The continuous light-shielding sheet after the trimming in the trimmer unit is conveyed to a seal attacher disposed in a sheet conveying path. In the seal attacher, an auxiliary seal is attached to an attaching position on the light-shielding sheet. After this attachment, the continuous light-shielding sheet is conveyed toward the spool supply path by a conveyor roller set including two rollers as a sheet supplier.

In the above embodiment, the adhesive tape 396 is a type of label or sticker and previously attached to the liner paper 331 by one piece. Alternatively continuous adhesive tape 375 of FIG. 29 may be used. For use of this, a tape cutter 377 may be disposed near to a support stage 376, for cutting the continuous adhesive tape 375 into the adhesive tape 396 of a regular length.

In the present-embodiment, the adhesive tape 396 cut away by the tape cutter 377 is supplied to the support stage 376, which has air discharge holes 379 for blowing air. The adhesive tape 396 is sucked by a suction head 380 from above the support stage 376. Photoelectric sensors 381 of a reflection type detect correctness of disposition of four corners of the adhesive tape 396. If the adhesive tape 396 is properly oriented, then the adhesive tape 396 is attached to the first end 394a of the photo filmstrip 394 by use of a single-shaft robot 382 and an air cylinder 383. The suction head 380 also has the photoelectric sensors 346 of FIGS. 25–27. After attachment to the photo filmstrip 394, the correct orientation of the adhesive tape 396 is checked with the photoelectric sensors 346 of the suction head 380, so that precision in positioning the adhesive tape 396 is heightened.

EXAMPLE

The minimum force at which the adhesive tape 396 is separable from the liner paper 331 is preferably equal to or less than 70 grams per 25 mm, and desirably in a range of 30–50 grams per 25 mm, in view of avoiding oblique orientation relative to the photo filmstrip 394, and avoiding jamming the adhesive tape 396 being supplied. Let θ be an angle of the edge member 332 for separation of the adhesive tape 396 from the liner paper 331. The angle θ is preferably in a range of 20–50°, and desirably in a range of 25–35°.

Let θ1 be an inclining angle of a top surface 340*a* of the ridges 340 on the support stage 333. The angle θ1 is preferably in a range of 0–15°, and desirably in a range of 3–8°. An experiment was conducted for the top surface 340*a*. It was checked that the adhesive tape 396 is readily separable from the ridges 340 with this range of the angle of the top surface 340*a*. Note that the top surface 340*a* of the ridges 340 is finished the most preferably with a teflon coating.

Note that the roll photo film is a 120 type in accordance with the above embodiment, but may be a 220 type or any other type in the present invention. The above structure can be used for attachment of adhesive tape to any product different from a roll photo film.

Figure 30:
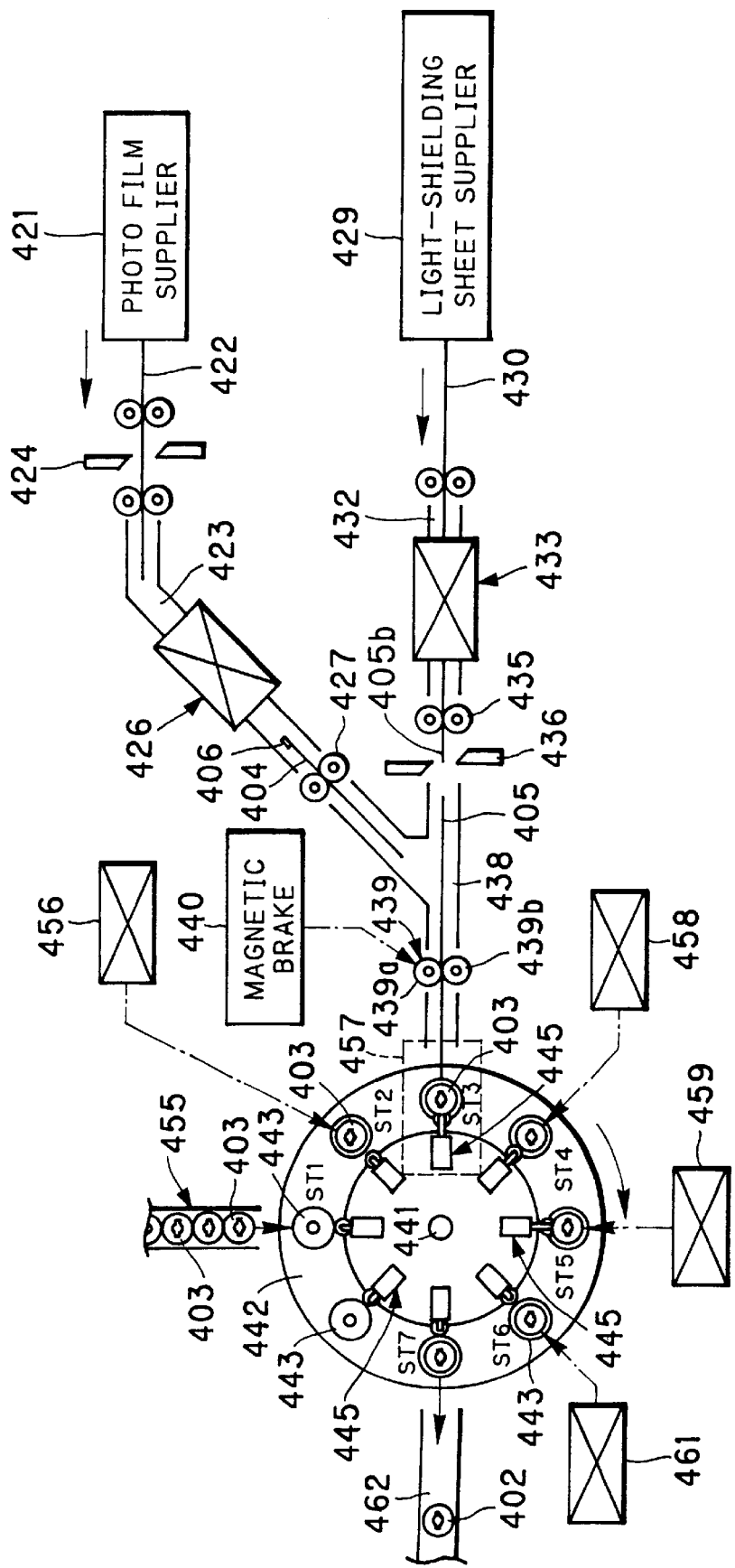
FIG. 30 is a schematic view illustrating another preferred producing apparatus in which back tension is applied to a light-shielding sheet.
Figure 31:
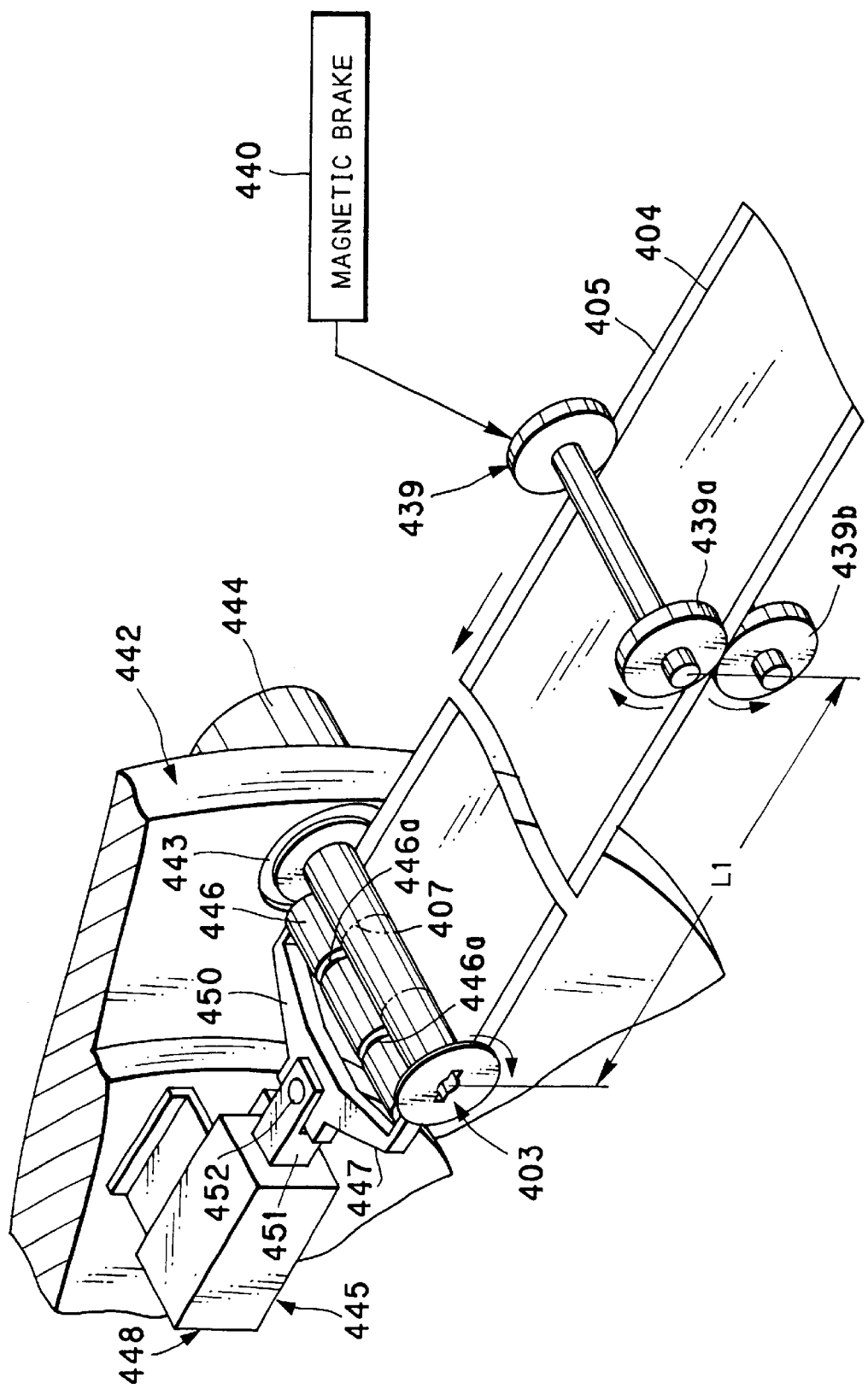
FIG. 31 is a perspective, partially broken, illustrating tension rollers and a touch roller in a sheet winder with the light-shielding sheet.
Figure 32:
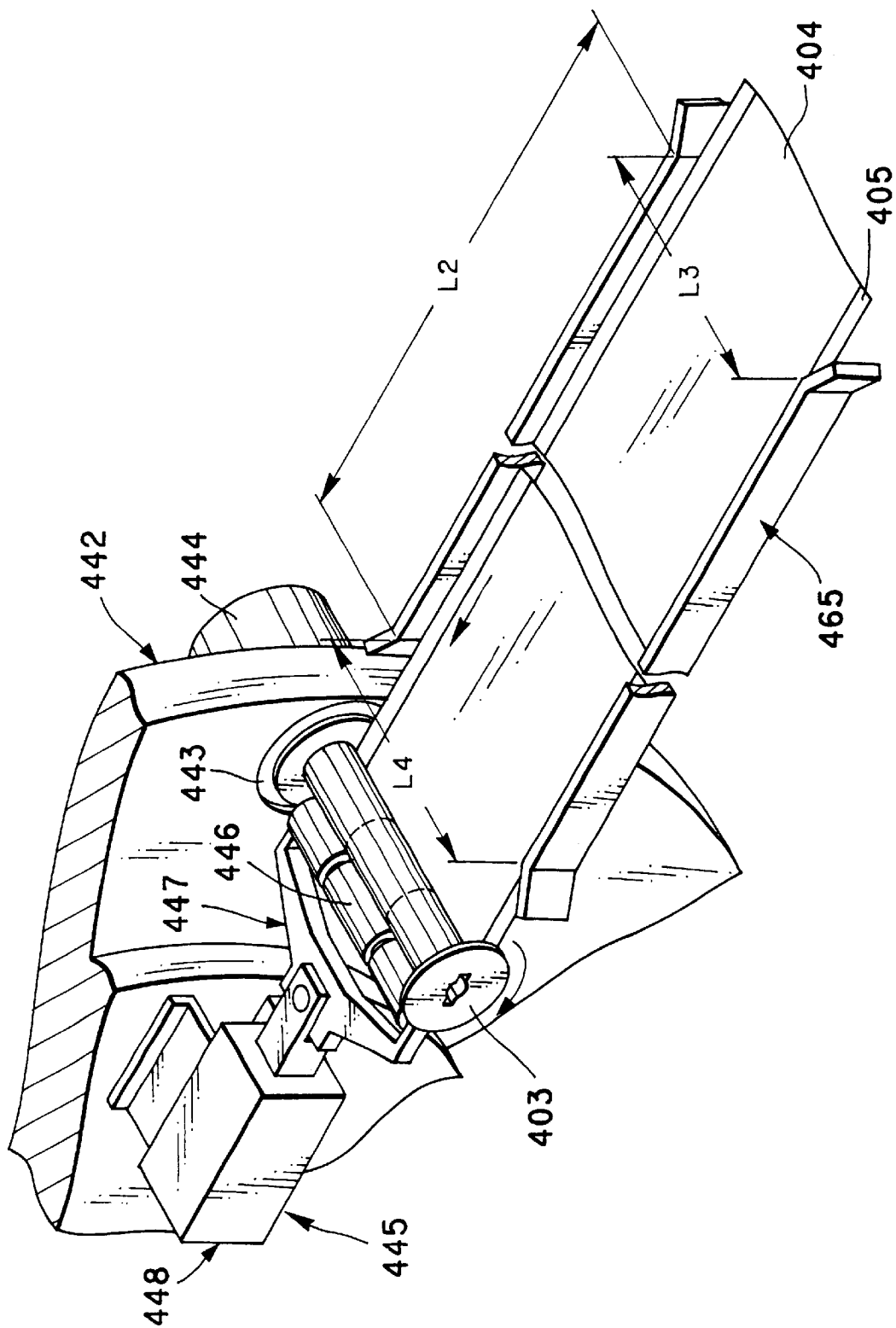
FIG. 32 is a perspective, partially broken, illustrating another preferred structure for applying back tension to the light-shielding sheet.

Referring to FIGS. 30–32, another preferred embodiment is described now, in which a photo filmstrip or a light-shielding sheet, during operation of rotating a spool, can be wound about the spool without scratches or other failure.

In FIG. 30, there are pusher units 445, each of which is associated with one of spool holders 443. The pusher unit 445 includes a solenoid 448 as a shifter and a grooved roller 446 connected thereto by a touch roller device 447. When the spool holder 443 is stopped in station ST1 or ST2, the solenoid 448 is kept energized. The grooved roller 446 is away from the spool holder 443. A tension roller set 439 including two rollers is disposed in a conveying path 438. When the spool holder 443 is stopped in station ST1 or ST2, a roller 439*b* of the tension roller set 439 is kept in a retracted position by a lifter mechanism.

When a spool 403 with a slit being rotationally positioned is transferred to station ST3, continuous light-shielding sheet 430 is conveyed to station ST3 by a conveyor roller set 435 including two rollers. A front end 405*b* of the continuous light-shielding sheet 430 is inserted in the slit of the spool 403. Upon the insertion, the solenoid 448 is turned off. A spring (not shown) causes a plunger 451 to move out in protrusion, so that the grooved roller 446 of a touch roller device 447 contacts a core of the spool 403. The lifter mechanism moves the roller 439*b* to a squeezing position, to squeeze the continuous light-shielding sheet 430 between it and a roller 439*a*.

While the pusher unit 445 operates, the continuous light-shielding sheet 430, is cut by a sheet cutter 436 to be a light-shielding sheet 405. A motor 444 of the spool holder 443 causes the spool 403 to make a few rotations in the winding direction, to wind the front end 405*b* of the light-shielding sheet 405 about the core of the spool 403. A reference numeral 457 designates a winder unit, which includes the motor 444.

When a few turns of the light-shielding sheet 405 are wound about the spool 403, then a photo filmstrip 404 is conveyed by a conveyor roller set 427 including two rollers from a photo film supply path, and is overlapped on the back of the light-shielding sheet 405. The motor 444 rotates the spool 403 further in the winding direction, to wind the light-shielding sheet 405 and the photo filmstrip 404 about the spool 403. The tension roller set 439 is providing the light-shielding sheet 405 with suitable tension, so that the light-shielding sheet 405 is kept from moving in a zigzag while wound to the core.

The pusher unit 445 pushes the light-shielding sheet 405 and the photo filmstrip 404 to the core of the spool 403 with suitable pushing force. Air is discharged from between the light-shielding sheet 405 and the photo filmstrip 404, to tighten turns of the light-shielding sheet 405 and the photo filmstrip 404 about the core. The touch roller device 447 is rotatable within a small angular range to adjust parallelism with an axial direction of the core. Even if the spool 403 is locally distorted, the touch roller device 447 can push the light-shielding sheet 405 in a suitable manner without deviated access of the grooved roller 446 to the core. Adhesive tape 406 placed on a first end of the photo filmstrip 404 is attached to the back of the light-shielding sheet 405 by the virtue of winding pressure in the course of the rotating operation.

The spool 403 provided with the photo filmstrip 404 and the light-shielding sheet 405 in station ST3 is transferred to station ST4 by rotation of a spool turret 442 while the pusher unit 445 pushes the light-shielding sheet 405 and prevents the light-shielding sheet 405 from loosening. In station ST4, a sheet bender 458 bends or folds a rear end of the-light-shielding sheet 405 inwards.

In station ST5, a closing seal 407 is wound about the rolled shape of the light-shielding sheet 405 by a seal winder 459. The pusher unit 445 still pushes the grooved roller 446 to the roll of the light-shielding sheet 405 and the closing seal 407. Grooves 446*a* formed in the grooved roller 446 are confronted with lateral edges of the closing seal 407, so that the lateral edges of the closing seal 407 do not receive heightened pressure. There does not occur a scratch due to slips of the photo filmstrip 404.

In station ST6, an inspector 461 inspects a diameter of a roll photo film 402. If the roll photo film 402 is determined unacceptable after the inspection, the roll photo film 402 is removed from the spool holder 443 and ejected externally.

Those mechanisms being so operated, the roll photo film 402 is produced. When checked and detected acceptable, the roll photo film 402 is removed from the spool holder 443 in station ST7, and transferred through an exit path 462, and conveyed to a packaging apparatus.

Note that the tension roller set 439 is disposed to pass the light-shielding sheet 405 through it, and is rotated by movement of the light-shielding sheet 405 toward the spool supply path. The roller 439*a* of the tension roller set 439 is associated with a magnetic brake 440, which applies rotational load to the tension roller set 439, and in which the rotational load is adjustable. The magnetic brake 440 includes a roller magnet and a load adjusting magnet (neither shown). The roller magnet is mounted on one end of the roller 439*a*. The load adjusting magnet is so confronted with the roller magnet as to confront one pole with a pole opposite to it. When the load adjusting magnet is moved, the rotational load to the roller 439*a* is changed. Note that the roller 439*b* is associated with the lifter mechanism and supported in a movable manner between a squeezing position for squeezing the light-shielding sheet 405 between it and the roller 439*a*, and a retracted position way from the light-shielding sheet 405.

In FIG. 30, reference numeral 421 designates a photo film supplier. 422 designates continuous photo film. 423 designates a photo film path. 424 designates a photo film cutter. 426 designates a tape attacher. 429 designates a light-shielding sheet supplier. 432 designates a sheet conveying path. 433 designates a seal attacher. 441 designates a turret shaft. 455 designates a spool supplier. 456 designates a spool position setter.

In FIG. 31, reference numeral 450 designates a roller support. 452 designates a pin for connecting the roller support 450 with the plunger 451.

In the above embodiment, the solenoid 448 is used for moving the touch roller device 447 in the pusher unit 445. Alternatively an air cylinder may be used. Furthermore, the tension roller set 439 may be disposed in a position before the conveying path 438, namely a position in the sheet conveying path before joining the photo film path.

In the above embodiment, the magnetic brake 440 is used to apply load to the tension roller set 439. Alternatively a frictional brake mechanism or a gear train may be used to do so. In the above embodiment, the grooved roller 446 is used. Alternatively a combination of three coaxial rollers may be used instead of the grooved roller 446 being single.

In the above embodiment, the tension roller set 439 applies back tension to the light-shielding sheet 405. Alternatively guide rails 465 of FIG. 32 may be used in contact with edges of the light-shielding sheet 405. In FIG. 32, L2 is a length of the tension-applying guide rails 465. L3 is a width of the inside of the tension-applying guide rails 465 at an upstream end further from the spool 403. L4 is a width of the inside of the tension-applying guide rails 465 at a downstream end nearer to the spool 403. L3 is smaller than a width of the light-shielding sheet 405. L4 is slightly greater than the width of the light-shielding sheet 405. Thus the width of the tension-applying guide rails 465 gradually increases from L3 to L4 downstream in the range L2. The back tension is applied to the light-shielding sheet 405 in a suitable manner.

EXAMPLE

An experiment was conducted, so that it was found that the pushing force of the pusher unit 445 was in a range of 100–300 grams, more preferably 150–200 grams.

In the embodiment with the tension roller set 439, the tension roller set 439 is disposed to satisfy L1=500 mm where L1 is a distance between the spool holder 443 and the tension roller set 439. With the magnetic brake 440 operated for the tension roller set 439, back tension of 70–130 grams A is applied by the tension roller set 439 to the light-shielding sheet 405. As a result of experiments, the back tension of the tension roller set 439 is preferably 90–110 grams.

In the embodiment with the tension-applying guide rails 465, examples of sizes of the tension-applying guide rails 465 are L2=500 mm, L3=62.3 mm and L4=62.8 mm. Let the light-shielding sheet 405 be 62.6 mm thick. This being so, the tension-applying guide rails 465 applies back tension of 70–130 grams to the light-shielding sheet 405. As a result of experiments, the back tension of the tension-applying guide rails 465 is preferably 90–110 grams in a manner similar to the tension roller set 439.

Note that the roll photo film 402 is a 120 type in accordance with the above embodiments, but may be a 220 type or any other type in the present invention.

Figure 33:
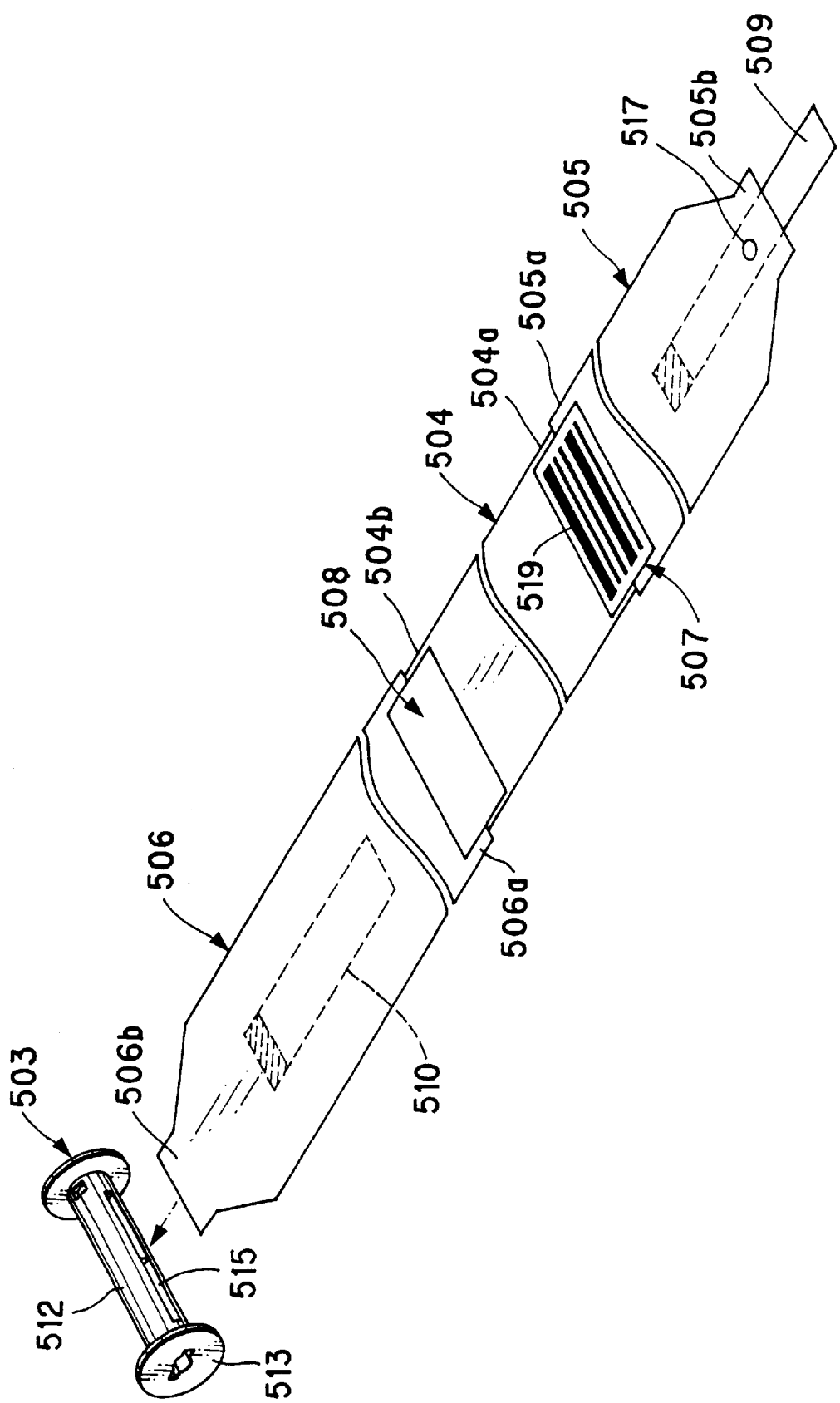
FIG. 33 is a perspective illustrating parts of another preferred roll photo film including a trailer sheet and a leader sheet.
Figure 34A:
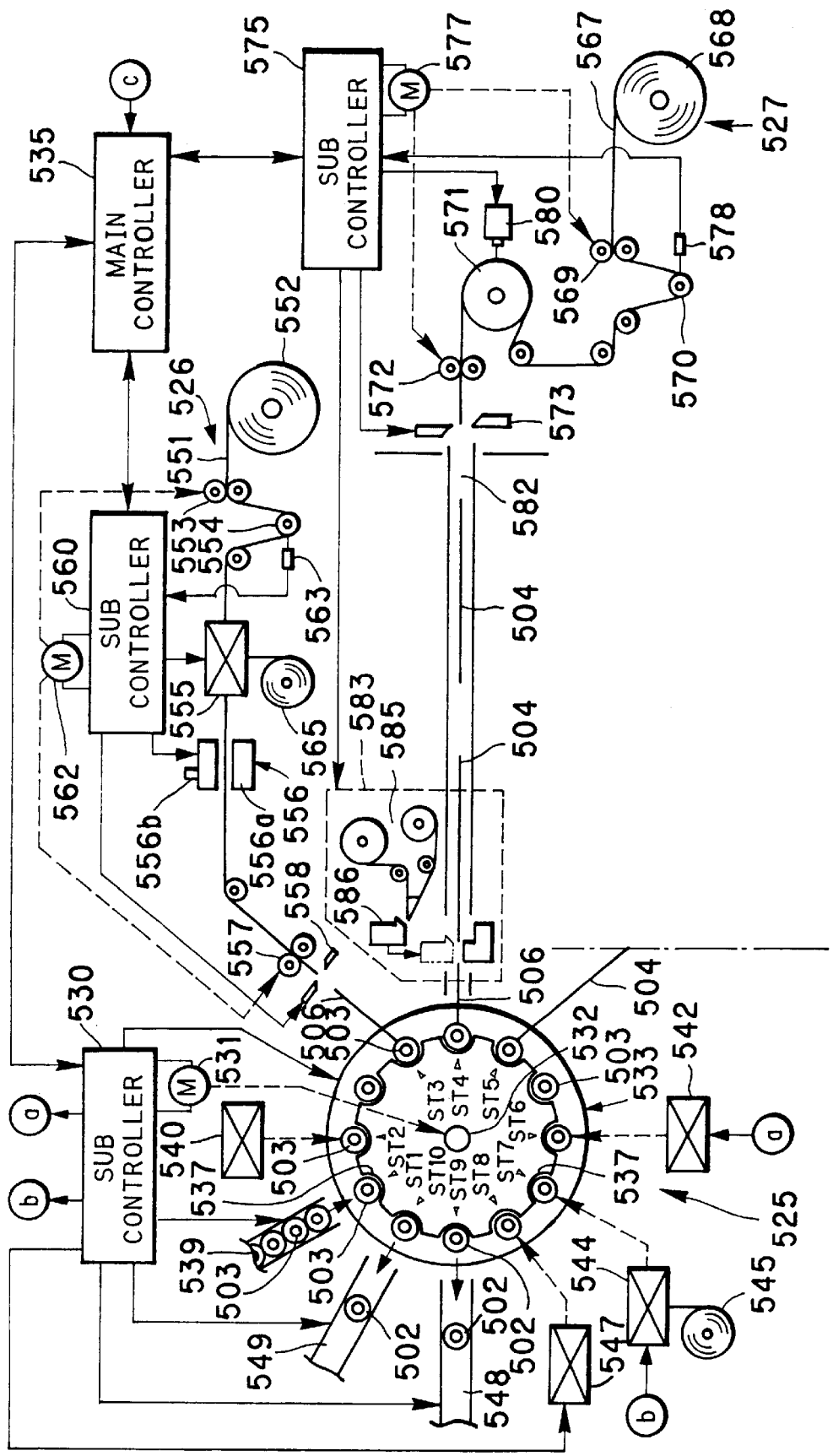
FIG. 34A is a schematic view illustrating an apparatus for producing the roll photo film.
Figures 34, 34B:
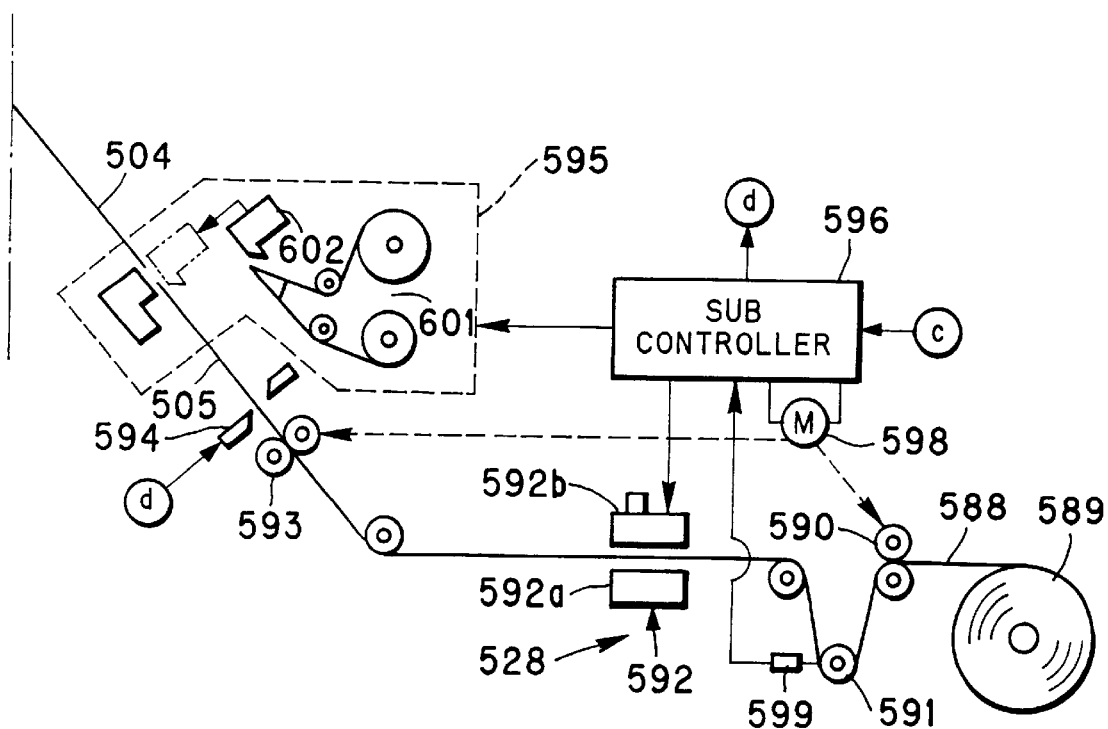
FIG. 34 is a diagram illustrating a combination of FIGS. 34A and 34B.
FIG. 34B is a schematic view illustrating a unit for supplying a leader sheet in the producing apparatus.
Figure 35:
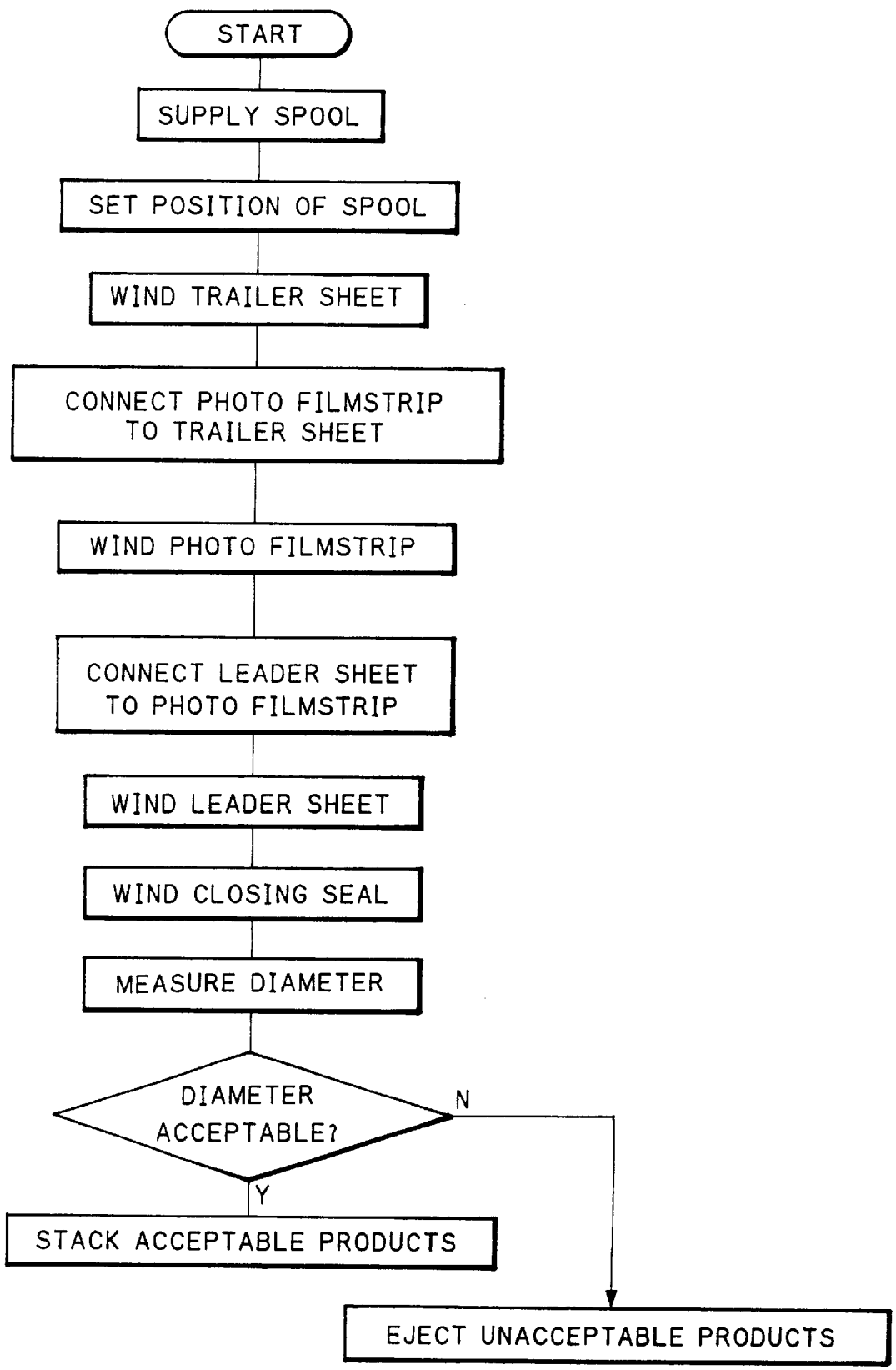
FIG. 35 is a flow chart illustrating operation of the producing apparatus.

Referring to FIGS. 33–35, another preferred embodiment is described, in which a trailer sheet and a leader sheet are included in a roll photo film with a photo filmstrip, and the photo filmstrip can be wound unfailingly with the trailer sheet and the leader sheet. FIG. 33 illustrates a roll photo film 502 of a 220 type. The roll photo film 502 includes a spool 503, a photo filmstrip 504, a leader sheet 505, a trailer sheet 506, adhesive tapes 507 and 508, a closing seal 509 and an auxiliary seal 510. The spool 503 is formed from plastic material. The photo filmstrip 504 has a predetermined length. The leader sheet 505 is secured to a first end 504a of the photo filmstrip 504. The trailer sheet 506 is secured to a second end 504b of the photo filmstrip 504.

The leader sheet 505 and the trailer sheet 506 have light-shielding ability. An end 505a of the leader sheet 505 and an end 506a of the trailer sheet 506 are straight and connected respectively to the ends 504a and 504b. An end 505b of the leader sheet 505 and an end 506b of the trailer sheet 506 have a narrowed shape. The end 506b is inserted in a slit 515 in the course of producing the roll photo film 502. The end 505b is inserted into a slit of a camera spool when a camera is loaded with the roll photo film 502. There is a retaining hole 517 formed in the end 505b of the leader sheet 505.

To produce the roll photo film 502 in an apparatus of FIGS. 34, 34A and 34B, relevant devices are operated according to a flow of FIG. 35. At first, the spool 503 for the roll photo film 502 is set into a spool supplier 539. A trailer sheet roll 552 is set into a trailer supply unit 526. A roll 568 of continuous photo film is set into a photo film supply unit 527. A leader sheet roll 589 is set into a leader supply unit 528.

A sub controller 530 is controlled by a main controller 535, and when the producing apparatus is started, drives a spool supplier 525. The sub controller 530 causes a motor 531 to rotate a spool turret 533 in a clockwise direction about a turret shaft 532 in an intermittent manner.

The spool turret 533 rotates, to stop an empty one of spool holders 537 in station ST1. The spool 503 from the spool supplier 539 is set into the spool holder 537. The spool turret 533 is rotated further, to transfer the spool 503 to station ST2. A spool position setter 540 sets a rotational position of the slit 515 as predetermined. The spool turret 533 is rotated further again, to transfer the spool 503 to station ST3.

The trailer supply unit 526 operates at the same time as the spool supplier 525. A sub controller 560 is controlled by the main controller 535, and causes a motor 562 to rotate a conveyor roller set 553 including two rollers. The conveyor roller set 553 nips continuous trailer sheet 551, rotates, and pulls the continuous trailer sheet 551 from the trailer sheet roll 552. A shiftable roller 554 is caused by a spring to move downwards, and is detected by a sensor 563. A detecting signal from the sensor 563 is sent to the sub controller 560, which responsively stops the conveyor roller set 553, and starts rotating a conveyor roller set 557 including two rollers. The continuous trailer sheet 551 has been locally reserved by the shift of the shiftable roller 554, and is conveyed toward a seal attacher 555. Note that an indicia may be printed on the continuous trailer sheet 551 for the trailer sheet 506, and may be detected by a photoelectric sensor for the purpose of controlling a stop and rotation of the conveyor roller set 553.

In the seal attacher 555, the auxiliary seal 510 is separated from a roll 565 of release paper or liner paper with seals. The auxiliary seal 510 is attached to a regular attaching position on a surface of the continuous trailer sheet 551.

The continuous trailer sheet 551 with the auxiliary seal 510 is conveyed to a trimmer unit 556, where a punch 556b is moved down to press the continuous trailer sheet 551 between it and a die 556a, so as to trim a printed portion to become the end 506b of the trailer sheet 506 with a reduced width. Note that a sheet cutter may be associated with the trimmer unit 556 instead of a trailer sheet cutter 558, and may operate for cutting the trailer sheet 506 from the continuous trailer sheet 551.

The continuous trailer sheet 551 after the trimming in the trimmer unit 556 is conveyed to the spool 503 stopped in station ST3. The end 506b of the continuous trailer sheet 551 is inserted into the slit 515 of the spool 503. A motor (not shown) in the spool holder 537 is driven to rotate the spool 503 in the winding direction. The continuous trailer sheet 551 is wound about a core 512 to form a few turns by making a few rotations.

When the continuous trailer sheet 551 is wound about the spool 503 by a regular length, rotation of the spool 503 is stopped. A trailer sheet cutter 558 cuts the trailer sheet 506 from the continuous trailer sheet 551. In the spool turret 533, the spool holder 537 keeps the trailer sheet 506 from being unwound about the core 512. The spool turret 533 transfers the spool 503 to station ST4 while the end 506a of the trailer sheet 506 remains protruded from the spool 503.

The photo film supply unit 527 is operating at the same time as the spool supplier 525 and the trailer supply unit 526. A sub controller 57–5 is controlled by the main controller 535, and causes a motor 57 to rotate a conveyor roller set 569 including two rollers. The conveyor roller set 569 rotates while squeezing continuous photo film 567, and draws the continuous photo film 567 from the roll 568. A shiftable roller 570 is caused by a spring to move downwards, and detected by a sensor 578. A signal from the sensor 578 is sent to the sub controller 575, which responsively stops the conveyor roller set 569 from rotating, and causes a conveyor roller set 572 including two rollers to rotate. The continuous photo film 567 has been locally reserved by the shift of the shiftable roller 570 by a predetermined length, and is conveyed toward a suction drum 571.

The conveyor roller set 569 conveyed to the suction drum 571 receives the air suction, and kept in tight contact with the periphery of the suction drum 571, and conveyed without slips. The photo film information and the manufacture information having been input in the main controller 535 is converted by the sub controller 575 into printing data, according to which a printing head 580 side-prints the information to edge portions of the continuous photo film 567.

The continuous photo film 567 after the side printing is conveyed by the conveyor roller set 572 toward a photo film cutter 573. The photo film cutter 573 responds to a command from the sub controller 575, and cuts the conveyor roller set 569 by the length associated with the number of available frames, to obtain the photo filmstrip 504 of this length.

The photo filmstrip 504 is conveyed toward station ST4 of the spool supplier 525 through a photo film path 582 by advancing the second end 504b. The second end 504b is moved to the end 506a of the trailer sheet 506 wound on the spool 503.

A first tape attacher unit 583 is disposed on the photo film path 582. In the first tape attacher unit 583, a tape supplier 585 supplies a suction head 586 with the adhesive tape 508. The suction head 586 applies air suction to the adhesive tape 508, sucks it, and attaches the adhesive tape 508 both to the end 506a of the trailer sheet 506 and to the second end 504b of the photo filmstrip 504, so that the trailer sheet 506 is secured to the photo filmstrip 504.

When the trailer sheet 506 is connected to the photo filmstrip 504, the sub controller 530 drives the motor of the spool holder 537, to rotate the spool 503 in the winding direction. The photo filmstrip 504 is wound about the core 512 of the spool 503 with the end 506a of the trailer sheet 506. In the spool turret 533, the spool holder 537 keeps the photo filmstrip 504 from being unwound about the core 512. The spool turret 533 transfers the spool 503 to station ST5 while the first end 504a of the photo filmstrip 504 remains protruded from the spool 503.

The leader supply unit 528 starts operating at the same time as the spool supplier 525, the trailer supply unit 526 and the photo film supply unit 527. A sub controller 596 is controlled by the main controller 535, and causes a motor 598 to rotate a conveyor roller set 590 including two rollers. The conveyor roller set 590 nips continuous leader sheet 588 and rotates, to draw the continuous leader sheet 588 from the leader sheet roll 589. A shiftable roller 591 is caused by a spring to shift downwards, and is detected by a sensor 599. A signal from the sensor 599 is sent to the sub controller 596, which responsively stops the conveyor roller set 590 from rotating, and also causes a conveyor roller set 593 including two rollers to rotate. The continuous leader sheet 588 has been locally reserved by the shift of the shiftable roller 591, and is conveyed toward a trimmer unit 592. Note that an indicia may be printed on the continuous leader sheet 588 for the leader sheet 505, and may be detected by a photo-electric sensor for the purpose of controlling a stop and rotation of the conveyor roller set 590.

In the trimmer unit 592, a punch 592b is moved down to press the continuous leader sheet 588 between it and a die 592a, to trim a printed portion to become the end 505b of the leader sheet 505 with a reduced width. At the same time the trimmer unit 592 forms the retaining hole 517. Note that a sheet cutter may be associated with the trimmer unit 592 instead of a leader sheet cutter 594, and may operate for cutting the leader sheet 505 from the continuous leader sheet 588.

The continuous leader sheet 588 after the trimming in the trimmer unit 592 is conveyed toward station ST5 of the spool supplier 525 by rotation of the conveyor roller set 593. The end 505a of the leader sheet 505 is directed to the first end 504a of the photo filmstrip 504 protruded from the spool 503.

A second tape attacher unit 595 has a tape supplier 601, which supplies a suction head 602 with the adhesive tape 507. The suction head 602 applies the air suction to the adhesive tape 507, sucks it, and attaches it both to a front end of the continuous leader sheet 588 and to the first end 504a of the photo filmstrip 504, so that the continuous leader sheet 588 is connected to the photo filmstrip 504. The sub controller 596 causes a leader sheet cutter 594 to cut the leader sheet 505 from the continuous leader sheet 588 after attaching the continuous leader sheet 588 to the photo filmstrip 504.

In the present embodiment, the adhesive tape 507 to connect the photo filmstrip 504 to the leader sheet 505 is placed initially on the leader sheet 505. Alternatively the adhesive tape 507 may be placed initially on the photo filmstrip 504. An extra attacher may be used for the adhesive tape 507 and operated when the first end 504a of the photo filmstrip 504 protrudes from the spool 503 in station ST4, or when the first end 504a of the photo filmstrip 504 lies in the photo film path 582. With this structure, the second tape attacher unit 595 may operate only to push the adhesive tape 507 to attachment of the photo filmstrip 504 and the leader sheet 505.

The sub controller 530 drives the motor of the spool holder 537, to rotate the spool 503 in the winding direction. All the leader sheet 505 is wound about the core 512 with the first end 504a of the photo filmstrip 504. In the spool turret 533, the spool holder 537 keeps the leader sheet 505 from being unwound about the core 512, while the spool turret 533 transfers the spool 503 to station ST6.

In station ST6, a sheet bender 542 bends or folds the end 505b of the leader sheet 505 inwards. In station ST7, a seal winder 544 types manufacture information and the like to the closing seal 509 placed on a roll 545 of release paper or liner paper with seals. Then the closing seal 509 is separated from the roll 545 and wound about the rolled shape of the leader sheet 505.

The roll photo film 502 finally obtained with the adhesive tape 507 is transferred by the spool turret 533 to station ST8. An inspector 547 measures a diameter of a rolled shape of the roll photo film 502. A result of inspection of the inspector 547 is sent via the sub controller 530 to the main controller 535, which stores the result.

The roll photo film 502 is transferred to station ST9. If a result of inspecting a diameter of the rolled shape is above or below the tolerable range, then the roll photo film 502 is removed from the spool holder 537 and ejected externally by an ejector 548. If the inspecting result is within the tolerable range, then the roll photo film 502 is transferred to an exit path 549 through station ST10, and conveyed to a packaging apparatus or the like.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An apparatus for producing a roll photo film, including a conveying path through which a front end of a light-shielding sheet is advanced, said light-shielding sheet having one securing position determined thereon to which a first end of a photo filmstrip is secured, a spool holder for supporting a spool, said spool having a core to which said front end of said light-shielding sheet from said conveying path is secured, a winder unit for rotating said spool on said spool holder in a winding direction, to wind said photo filmstrip and said light-shielding sheet about said core for obtaining said roll photo film, said roll photo film producing apparatus comprising:

a tension applying unit, disposed in said conveying path, for applying back tension of 70–130 grams to said light-shielding sheet, while said spool is rotated in said winding direction.

2. A roll photo film producing apparatus as defined in claim 1, further comprising a pusher unit, disposed with said winder unit, for pushing said light-shielding sheet to said core of said spool with pushing force of 100–300 grams while said spool is rotated in said winding direction.

3. A roll photo film producing apparatus as defined in claim 1, wherein said pusher unit is configured and arranged to push said light-shielding sheet and said photo filmstrip, after a predetermined amount of the light-shielding sheet has been wound on said spool, to said core of said spool with pushing force of 100–300 grams while said spool is rotated in said winding direction.

4. A roll photo film producing apparatus as defined in claim 1, wherein said tension applying unit includes:

a tension roller for rotating in contact with said light-shielding sheet; and a brake device for applying load to rotation of said tension roller.

5. A roll photo film producing apparatus as defined in claim 1, wherein said tension applying unit includes a pair of rails, arranged at a first interval therebetween, for contacting lateral edges of said light-shielding sheet, wherein a minimum of said first interval is smaller than a width of said light-shielding sheet.

6. A roll photo film producing apparatus as defined in claim 1, wherein said tension applying unit is configured and arranged to apply a back tension of 70–130 grams to said light-shielding sheet and said photo filmstrip, after a predetermined amount of the light-shielding sheet has been wound on said spool, while said spool is rotated in said winding direction.

7. An apparatus for producing a roll photo film, including a conveying path through which a front end of a light-shielding sheet is advanced, said light-shielding sheet having one securing position determined thereon to which a first end of a photo filmstrip is secured, a spool holder for supporting a spool, said spool having a core to which said front end of said light-shielding sheet from said conveying path is secured, a winder unit for rotating said spool on said spool holder in a winding direction, to wind said photo filmstrip and said light-shielding sheet about said core for obtaining said roll photo film, said roll photo film producing apparatus comprising:

a pusher unit disposed with said winder unit, for pushing said light-shielding sheet to said core of said spool with pushing force of 100–300 grams while said spool is rotated in said winding direction.

8. A roll photo film producing apparatus as defined in claim 7, wherein said pusher unit includes a touch roller for rotating in contact with said light-shielding sheet about said core.

9. A roll photo film producing apparatus as defined in claim 8, wherein said pusher unit further includes a shifter for shifting said touch roller toward and away from said core.

10. A roll photo film producing apparatus as defined in claim 8, further comprising a seal winder unit for winding a closing seal about a roll form of said photo filmstrip and said light-shielding sheet on said core, to avoid unwinding said roll form;

said touch roller includes a pair of grooves formed therein and confronted with respective lateral edges of said closing seal.

11. A roll photo film producing apparatus as defined in claim 8, wherein said touch roller is configured and arranged for rotating while pressing said light-shielding sheet and said photo filmstrip, after a predetermined amount of the light-shielding sheet has been wound, about said core.

12. A roll photo film producing apparatus as defined in claim 7, wherein said pusher nit is configured and arranged to push said light-shielding sheet and said photo filmstrip, after a predetermined amount of the light-shielding sheet has been wound on said spool, to said core of said spool with pushing force of 100–300 grams while said spool is rotated in said winding direction.

* * * * *